US012669876B2

(12) United States Patent
Keller et al.

(10) Patent No.: US 12,669,876 B2
(45) Date of Patent: *Jun. 30, 2026

(54) COMPUTING INTERFACE SYSTEM

(71) Applicant: Opdig, Inc., San Jose, CA (US)

(72) Inventors: Eric Jeffrey Keller, Quincy, MA (US); Vinh Vi Lam, San Jose, CA (US); Frank Peter Lambrecht, Danville, CA (US)

(73) Assignee: Opdig, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,912

(22) Filed: Jul. 22, 2019

(65) Prior Publication Data

US 2019/0346940 A1 Nov. 14, 2019

Related U.S. Application Data

(63) Continuation of application No. 14/190,044, filed on Feb. 25, 2014, now Pat. No. 10,503,275, which is a
(Continued)

(51) Int. Cl.
| | |
|---|---|
| *G06F 3/0346* | (2013.01) |
| *G06F 3/01* | (2006.01) |
| *G06F 3/023* | (2006.01) |

(52) U.S. Cl.
CPC ............ *G06F 3/0346* (2013.01); *G06F 3/014* (2013.01); *G06F 3/017* (2013.01); *G06F 3/0233* (2013.01);
(Continued)

(58) Field of Classification Search
CPC ...... G06F 3/0346; G06F 3/0233; G06F 3/017; G06F 3/014; G06F 2203/0331; G06F 2203/0383
(Continued)

(56) References Cited

U.S. PATENT DOCUMENTS

| | | | |
|---|---|---|---|
| 3,972,038 A | | 7/1976 | Fletcher et al. |
| 5,714,698 A | * | 2/1998 | Tokioka .................. G06F 3/014 |
| | | | 73/510 |

(Continued)

FOREIGN PATENT DOCUMENTS

| | | |
|---|---|---|
| EP | 2418562 A1 | 2/2012 |
| KR | 10-2005-0001200 | 1/2005 |

(Continued)

OTHER PUBLICATIONS

Fukumoto, et al., Body Coupled FingeRing: Wireless Wearable Keyboard, CHI 97, Mar. 26, 1997, Association for Computing Machinery, Atlanta, Georgia, avaiable at http://old.sigchi.org/chi97/proceedings/paper/fkm.htm.
(Continued)

*Primary Examiner* — Ifedayo B Iluyomade

(57) ABSTRACT

Computing interface systems and methods are disclosed. Some implementations include a first accelerometer attached to a first fastening article that is capable of holding the first accelerometer in place on a portion of a thumb of a user. Some implementations may also include a second accelerometer attached to a second fastening article that is capable of holding the second accelerometer in place on a portion of a wrist of a user. Some implementations may additionally or alternatively include magnetometers and/or gyroscopes attached to the first and second fastening articles. Some implementations may also include a processing device configured to receive measurements from the accelerometers, magnetometers, and/or gyroscopes and identify, based on the measurements, symbols associated with motions of a user's hand and/or the orientation of the hand. Some implementations may allow a user to control a cursor in a three dimensional virtual space and interact with objects in that space.

20 Claims, 12 Drawing Sheets

Related U.S. Application Data continuation of application No. 13/804,871, filed on Mar. 14, 2013, now Pat. No. 8,743,052.

(60) Provisional application No. 61/729,573, filed on Nov. 24, 2012.

(52) U.S. Cl.
CPC ................ *G06F 2203/0331* (2013.01); *G06F 2203/0383* (2013.01)

(58) Field of Classification Search
USPC ................................................. 345/156–184
See application file for complete search history.

(56) References Cited

U.S. PATENT DOCUMENTS

| | | | |
|---|---|---|---|
| 6,380,923 | B1 | 4/2002 | Fukumoto et al. |
| 6,515,669 | B1 * | 2/2003 | Mohri ..................... G06F 3/014 |
| | | | 345/418 |
| 7,533,569 | B2 | 5/2009 | Sheynblat |
| 7,565,295 | B1 | 7/2009 | Hernandez-Rebollar |
| 8,140,339 | B2 | 3/2012 | Hernandez-Rebollar |
| 8,228,315 | B1 | 7/2012 | Starner et al. |
| 10,503,275 | B2 * | 12/2019 | Keller .................... G06F 3/0233 |
| 2003/0142065 | A1 | 7/2003 | Pahlavan |
| 2004/0012559 | A1 * | 1/2004 | Seki ....................... G06F 3/0354 |
| | | | 345/156 |
| 2008/0231602 | A1 * | 9/2008 | Kusuda ................. G06F 3/0238 |
| | | | 345/168 |
| 2009/0158203 | A1 | 6/2009 | Kerr et al. |
| 2010/0023314 | A1 * | 1/2010 | Hernandez-Rebollar .................... |
| | | | G10L 13/00 |
| | | | 704/3 |
| 2010/0090949 | A1 | 4/2010 | Tianqiao et al. |
| 2010/0271302 | A1 | 10/2010 | Pering et al. |
| 2010/0324384 | A1 * | 12/2010 | Moon ..................... A61B 5/746 |
| | | | 600/323 |
| 2011/0112771 | A1 * | 5/2011 | French ............... A63B 24/0062 |
| | | | 702/19 |
| 2011/0205156 | A1 | 8/2011 | Gomez et al. |
| 2011/0260963 | A1 | 10/2011 | Timmons |
| 2012/0139708 | A1 * | 6/2012 | Paradiso ................. G06F 3/014 |
| | | | 340/10.1 |
| 2012/0319940 | A1 * | 12/2012 | Bress ....................... G06F 3/014 |
| | | | 345/156 |
| 2013/0136301 | A1 | 5/2013 | Abrahamsson et al. |
| 2013/0147722 | A1 * | 6/2013 | Lin ......................... G06F 3/014 |
| | | | 345/173 |

FOREIGN PATENT DOCUMENTS

| | | | |
|---|---|---|---|
| WO | WO 2010-034795 | A1 | 4/2010 |
| WO | WO 2011-130752 | A1 | 10/2011 |

OTHER PUBLICATIONS

Graham, Brian B., Using an Accelerometer Sensor to Measure Human Hand Motion, (student thesis), May 11, 2000, Massachusetts Institute of Technology, Cambridge, Massachusetts.

Hernandez-Rebollar, et al., The AcceleGlove: A Whole-Hand Input Device for Virtual Reality, ACM SIGGRAPH 2002, Jul. 21-26, 2002, p. 259, San Antonio, Texas.

Gibbs, et al., Reducing Motion Artifact in Wearable Bio-Sensors Using MEMS Accelerometers for Active Noise Cancellation, 2005 American Control Conference, Jun. 8-10, 2005, pp. 1581-1586, Portland, Oregon.

Iwamoto, et al., Finger Ring Tactile Interface Based on Propagating Elastic Waves on Human Fingers, Second Joint EuroHaptics Conference and Symposium on Haptic Interfaces for Virtual Environment and Teleoperator Systems (WHC 2007), Mar. 22-24, 2007, pp. 145-150, IEEE Computer Society, Tsukuba, Japan.

Yun, et al., Self-contained Position Tracking of Human Movement Using Small Inertial/Magnetic Sensor Modules, 2007 IEEE Intl. Conf. on Robotics and Automation, Apr. 10-14, 2007, pp. 2526-2533, IEEE, Roma, Italy.

Iwamoto, et al., Finger Ring Device for Tactile Sensing and Human Machine Interface, SICE Annual Conference 2007, Sep. 17-20, 2007, pp. 2132-2136, Kagawa University, Japan.

Sauser, Brittany, Computerized Combat Glove, MIT Technology Review (online magazine), Apr. 28, 2008, available at http://www.technologyreview.com/news/410041/computerized-combat-glove/.

Page, Lewis, DARPA Working on Inertial-nav Smart Boot Tech, The Register (online magazine), May 14, 2009, available at http://www.theregister.co.uk/2009/05/14/darpa_smart_boot/.

Savov, Vlad, Skinput: Because Touchscreens Never Felt Right Anyway, Engadget (online magazine), Mar. 2, 2010, available at http://www.engadget.com/2010/03/02/skinput-because-touchscreens-never-felt-right-anyway-video/.

Murph, Darren, Genius Ring Mouse Slips Around Your Finger, Cues Up Beyonce Jams, Engadget (online magazine), Sep. 8, 2010, available at http://www.engadget.com/2010/09/08/genius-ring-mouse-slips-around-your-finger-cues-up-beyonce-jams/.

Stevens, Tim, NEC's ArmKeypad Lets You Play Charades to Control Your Media Player, Engadget (online magazine), Mar. 16, 2011, available at http://www.engadget.com/2011/03/16/necs-armkeypad-lets-you-play-charades-to-control-your-media-pla/.

Bainbridge, et al., Wireless Hand Gesture Capture Through Wearable Passive Tag Sensing, 2011 International Conference on Body Sensor Networks, May 23-25, 2011, pp. 200-204, IEEE, Dallas, Texas.

BBC, Microsoft's Digits Hand-Gesture Sensor Bracelet Detailed, BBC News Technology (online magazine), Oct. 9, 2012, available at http://www.bbc.co.uk/news/technology-19884218.

Olanoff, Drew, Mycestro Is a 3D Mouse for Your Fingertips that You'll Look Funny Using, But Who Cares, TechCrunch (online magazine), Feb. 18, 2013, available at http://techcrunch.com/2013/02/18/mycestro-is-a-3d-mouse-for-your-fingertips-that-youll-look-funny-using-but-who-cares/.

Hewitt, John, The MYO Gesture-Control Armband Sense Your Muscle's Movements, ExtremeTech (online magazine), Feb. 27, 2013, available at http://www.extremetech.com/extreme/149335-the-myo-gesture-control-armband-senses-your-muscles-movements.

Source Audio LLC, Hot Hand 3 Universal Wireless Effects Controller—Product Information (webpage), accessed on May 20, 2013, available at http://www.sourceaudio.net/products/hothand/hothand3.php.

Invensense, Inc., InvenSense Technology, www.invensense.com (website), accessed on May 28, 2013, available at http://www.invensense.com/mems/technology.html.

Iron Will Innovations, The Peregrine, www.theperegrine.com (website), accessed on May 28, 2013, available at http://theperegrine.com/product/.

Ringbow, Ringbow, ringbow.com (website), accessed on May 29, 2013, available at http://ringbow.com/.

Bachmann, "Inertial and magnetic tracking of limb segment orientation for inserting humans into synthetic environments," Ph.D. dissertation, Naval Postgraduate School, Monterey, CA, 2000.

Gebre-Egziabher, G. H. Klkaim, J. Powell, and B. W. Parkinson, "A gyro-free quaternion-based attitude determination system suitable for implementation using low cost sensors," in Proc. IEEE Position Location Navigation Symp., San Diego, CA, Mar. 2000, pp. 185-192.

Luinge, "Inertial sensing of human movement," Ph.D. dissertation, Univ. Twente, Enschede, The Netherlands, Dec. 2002.

E. R. Bachmann, X. Yun, D. McKinney, R. B. McGhee, and M. J. Zyda, "Design and implementation of MARG sensors for 3-DOF orientation measurement of rigid bodies," in Proc. IEEE Int. Conf. Robot. Autom., Taipei, Taiwan, R. O.C., May 2003, vol. 1, pp. 1171-1178.

R. Zhu and Z. Zhou, "A real-time articulated human motion tracking using tri-axis inertial/magnetic sensors package," IEEE Trans. Neural Syst. Rehabil. Eng., vol. 12, No. 2, pp. 295-302, Jun. 2004.

(56) References Cited

OTHER PUBLICATIONS

A. Gallagher, Y. Matsuoka, andW.-T. Ang, "An efficient real-time human posture tracking algorithm using low-cost inertial and magnetic sensors," in Proc. IEEE Int. Conf. Robot. Autom., Sendai, Japan, Sep. 28-Oct. 2, 2004, pp. 2967-2972.

X.Yun, E. R. Bachmann, and R. B. McGhee, "A Simplified Quaternion-Based Algorithm for Orientation Estimation From Earth Gravity and Magnetic Field Measurements," IEEE Transactions on Instrumentation and Measurement, vol. 57, No. 3, Mar. 2008, pp. 638-650.

* cited by examiner

| Target | Forearm Angle | Palm Orientation | Left Hand Symbol |
|---|---|---|---|
| Index tip | 70 to 110 degrees | Up | E |
| Middle tip | 70 to 110 degrees | Up | S |
| Ring tip | 70 to 110 degrees | Up | T |
| Pinkie tip | 70 to 110 degrees | Up | 'Backspace' |
| Index Middle Phalanx | 70 to 110 degrees | Up | A |
| Middle Middle Phalanx | 70 to 110 degrees | Up | D |
| Ring Middle Phalanx | 70 to 110 degrees | Up | R |
| Pinkie Middle Phalanx | 70 to 110 degrees | Up | 'Shift' |
| Index tip | 30 to 70 degrees | Up | Q |
| Middle tip | 30 to 70 degrees | Up | Z |
| Ring tip | 30 to 70 degrees | Up | 'Tab' |
| Pinkie tip | 30 to 70 degrees | Up | 'Ctrl' |
| Index Middle Phalanx | 30 to 70 degrees | Up | ( |
| Middle Middle Phalanx | 30 to 70 degrees | Up | 'Esc' |
| Ring Middle Phalanx | 30 to 70 degrees | Up | 'Caps Lock' |
| Pinkie Middle Phalanx | 30 to 70 degrees | Up | 'Alt' |
| Index tip | 70 to 110 degrees | sideways | C |

FIG. 10B

| Target | Forearm Angle | Palm Orientation | Left Hand Symbol |
|---|---|---|---|
| Middle tip | 70 to 110 degrees | sideways | G |
| Ring tip | 70 to 110 degrees | sideways | F |
| Pinkie tip | 70 to 110 degrees | sideways | , |
| Index Middle Phalanx | 70 to 110 degrees | sideways | W |
| Middle Middle Phalanx | 70 to 110 degrees | sideways | V |
| Ring Middle Phalanx | 70 to 110 degrees | sideways | X |
| Pinkie Middle Phalanx | 70 to 110 degrees | sideways | 'Carriage Return' |
| Index tip | 30 to 70 degrees | sideways | 1 |
| Middle tip | 30 to 70 degrees | sideways | 2 |
| Ring tip | 30 to 70 degrees | sideways | 3 |
| Pinkie tip | 30 to 70 degrees | sideways | 4 |
| Index Middle Phalanx | 30 to 70 degrees | sideways | 9 |
| Middle Middle Phalanx | 30 to 70 degrees | sideways | + |
| Ring Middle Phalanx | 30 to 70 degrees | sideways | * |
| Pinkie Middle Phalanx | 30 to 70 degrees | sideways | = |
| Index tip | N/A (Cursor Mode) | down | 'Left Cursor Select' |
| Middle tip | N/A (Cursor Mode) | down | 'Left Cursor Options' |

FIG. 10C

| Target | Forearm Angle | Palm Orientation | Left Hand Symbol |
|---|---|---|---|
| Ring tip | N/A (Cursor Mode) | down | 'Left Aux Button 1' |
| Pinkie tip | N/A (Cursor Mode) | down | 'Left Aux Button 2' |
| Index Middle Phalanx | N/A (Cursor Mode) | down | 'Left Aux Button 3' |
| Middle Middle Phalanx | N/A (Cursor Mode) | down | 'Left Aux Button 4' |
| Ring Middle Phalanx | N/A (Cursor Mode) | down | 'Left Aux Button 5' |
| Pinkie Middle Phalanx | N/A (Cursor Mode) | down | 'Left Aux Button 6' |

1100

Receive measurements from sensors of interface
1110

Detect occurrence of thumb tap event
1120

Determine orientation of thumb during tap event
1130

Identify tap target
1140

Determine orientation of wrist
1150

Assign symbol to tap
1160

Transmit, Store, and/or Display the symbol
1170

COMPUTING INTERFACE SYSTEM

CROSS-REFERENCE TO RELATED APPLICATION

This application is a continuation of U.S. patent application Ser. No. 14/190,044 filed on Feb. 25, 2014, which is a continuation of U.S. patent application Ser. No. 13/804,871 filed on Mar. 14, 2013, which claims the benefit of U.S. Provisional Patent Application No. 61/729,573, which was filed on Nov. 24, 2012. The entire contents of these applications are hereby incorporated by reference in the specification of this application.

TECHNICAL FIELD

This disclosure relates to systems and methods for human-computer interaction through hand motions.

BACKGROUND

Computing devices are often equipped with one or more interfaces for interpreting hand motions of a user. For decades the Qwerty keyboard and mouse were the dominant interface devices in the computing field. More recently, the touch screen interface has gained popularity. Another relatively recent development has been the use of hand-held gaming controllers that use accelerometers to detect hand motions of a user.

SUMMARY

In a first aspect, in general, the subject matter described in this specification can be embodied in systems that include a first accelerometer and a first fastening article attached to the first accelerometer, the first fastening article capable of holding the first accelerometer in place on a portion of a thumb of a user. The systems may include a second accelerometer and a second fastening article attached to the second accelerometer, the second fastening article capable of holding the second accelerometer in place on a portion of a wrist of a user.

This and other aspects can each optionally include one or more of the following features. The first fastening article may be a ring band. The second fastening article may be a wrist band. A system may include first magnetometer attached to the first fastening article and a second magnetometer attached to the second fastening article. A system may include a processing device configured to receive acceleration measurements from the first accelerometer and determine, based at least in part on the received acceleration measurements, when a thumb of a user wearing the first fastening article and the second fastening article has been tapped against a surface. The processing device may be further configured to receive acceleration measurements from the second accelerometer, receive magnetic flux measurements from the first magnetometer and from the second magnetometer, and when a tap of the thumb is detected, determine, based at least in part on acceleration measurements from the first accelerometer and the second accelerometer and on magnetic flux measurements from the first magnetometer and the second magnetometer, which tap target from among a set of tap targets located on fingers of a hand of the user have been tapped by the thumb. The processing device may be further configured to map the tap of the tap target to a symbol associated with the tap target. A system may include a first gyroscope attached to the first fastening article and a second gyroscope attached to the second fastening article. A system may include a processing device configured to receive acceleration measurements from the first accelerometer and determine, based at least in part on the received acceleration measurements, when a thumb of a user wearing the first fastening article and the second fastening article has been tapped against a surface. The processing device may be further configured to receive acceleration measurements from the second accelerometer, receive angular rate measurements from the first gyroscope and from the second gyroscope, and when a tap of the thumb is detected, determine, based at least in part on acceleration measurements from the first accelerometer and the second accelerometer and on angular rate measurements from the first gyroscope and the second gyroscope, which tap target from among a set of tap targets located on fingers of a hand of the user have been tapped by the thumb. The processing device may be further configured to map the tap of the tap target to a symbol associated with the tap target. A system may include two or more wires that connect the first fastening device to the second fastening device. A system may include a wireless transmitter attached to the second fastening article, and the wireless transmitter may be configured to transmit data based on acceleration measurements from the second accelerometer to a computing device. A system may include a wireless transmitter attached to the second fastening article, and the wireless transmitter may be configured to transmit data based on acceleration measurements from the first accelerometer to a computing device. A system may include a processing device configured to receive acceleration measurements from the first accelerometer and determine, based at least in part on the received acceleration measurements, when a thumb of a user wearing the first fastening article and the second fastening article has been tapped against a surface. The processing device may be further configured to receive acceleration measurements from the second accelerometer and when a tap of the thumb is detected, determine, based at least in part on acceleration measurements from the first accelerometer and the second accelerometer, which tap target from among a set of tap targets located on fingers of a hand of the user have been tapped by the thumb. The processing device may be further configured to map the tap of the tap target to a symbol associated with the tap target. A system may include a display device configured to present images produced by the processing device and the images may include graphic representations of symbols selected based the data. The display device may be a liquid crystal display. The display device may be a projector. The processing device may be attached to the second fastening article. The processing device may be part of a remote computing device.

In a second aspect, in general, the subject matter described in this specification can be embodied in methods that include receiving a first set of acceleration measurements from a first accelerometer that is attached to a thumb of a user. The methods may include receiving a second set of acceleration measurements from a second accelerometer that is attached to a wrist of the user. The methods may include detecting, based at least in part on the first set of acceleration measurements, when the thumb is tapped on a surface. The methods may include when a tap of the thumb is detected, determining, based at least in part on the first set of acceleration measurements and the second set of acceleration measurements, an orientation of the first accelerometer relative to the second accelerometer. The methods may include identifying, based on the orientation, a tap target, from among a plurality of tap targets located on fingers of the user, that was touched during the tap. The methods may include assigning a symbol associated with the tap target to the tap. The methods may include transmitting, storing, or displaying the symbol.

This and other aspects can each optionally include one or more of the following features. A first set of magnetic flux measurements may be received from a first magnetometer that is attached to the thumb of the user. A second set of magnetic flux measurements may be received from a second magnetometer that is attached to the wrist of the user. The orientation may be determined based at least in part on the first set of magnetic flux measurements and the second set of magnetic flux measurements. Determining the orientation may include filtering the first set acceleration measurements to determine a first estimate of acceleration experienced by the first accelerometer while the thumb was at rest with respect to a hand of the user on the tap target; filtering the second set of acceleration measurements to determine a second estimate of acceleration experienced by the second accelerometer while the thumb was at rest with respect to the hand of the user on the tap target; filtering the first set magnetic flux measurements to determine a first estimate of magnetic flux experienced by the first magnetometer while the thumb was at rest with respect to the hand of the user on the tap target; filtering the second set of magnetic flux measurements to determine a second estimate of magnetic flux experienced by the second accelerometer while the thumb was at rest with respect to the hand of the user on the tap target; and determining a rotation that will approximately align the first estimate of acceleration with the second estimate of acceleration and that also will approximately align the first estimate of magnetic flux with the second estimate of magnetic flux. A first set of angular rate measurements may be received from a first gyroscope that is attached to the thumb of the user. A second set of angular rate measurements may be received from a second gyroscope that is attached to the wrist of the user. The orientation may be determined based at least in part on first set of angular rate measurements and the second set of angular rate measurements. Determining the orientation may include integrating the first set of acceleration measurements and the first set of angular rate measurements to determine a first estimate of an orientation, with respect to a reference position, of the first accelerometer at a time during the tap; integrating the second set of acceleration measurements and the second set of angular rate measurements to determine a second estimate of an orientation, with respect to a reference position, of the second accelerometer at the time during the tap; and comparing the first estimate of the orientation of the first accelerometer to the second estimate of the orientation of the second accelerometer. An estimate may be determined, based on the second set of acceleration measurements, of an orientation of an acceleration experienced by the second accelerometer with respect to the axes of the second accelerometer during the tap. Assigning the symbol to the tap may include selecting the symbol from among a plurality of symbols associated with the tap target based on the orientation of the acceleration experienced by the second accelerometer. The acceleration experienced by the second accelerometer may be dominated by acceleration caused by the gravitational force of the Earth and the selection may be made based at least in part on an estimate of an angle between the gravitational acceleration and an axis running approximately parallel to a forearm of the user. The user may be enabled to indicate a choice from among the plurality of the symbols associated with the tap target, by adjusting the angle of wrist or the angle of a forearm of the user with respect to the gravitational force of the Earth during the tap. The user may be enabled to turn a palm side of the wrist down to face towards the Earth to enter a cursor manipulation mode, in which acceleration measurements from the second accelerometer are used to move a cursor in a virtual space. Determining the orientation may include filtering the first set of acceleration measurements to determine an estimate of a deceleration vector caused by the impact of the thumb with the tap target.

In a third aspect, in general, the subject matter described in this specification can be embodied in systems that include a data processing apparatus and a data storage device storing instructions executable by the data processing apparatus that upon execution by the data processing apparatus cause the data processing apparatus to perform operations including receiving a first set of acceleration measurements from a first accelerometer that is attached to a thumb of a user. The operations may include receiving a second set of acceleration measurements from a second accelerometer that is attached to a wrist of the user. The operations may include detecting, based at least in part on the first set of acceleration measurements, when the thumb is tapped on a surface. The operations may include when a tap of the thumb is detected, determining, based at least in part on the first set of acceleration measurements and the second set of acceleration measurements, an orientation of the first accelerometer relative to the second accelerometer. The operations may include identifying, based on the orientation, a tap target, from among a plurality of tap targets located on fingers of the user, that was touched during the tap. The operations may include assigning a symbol associated with the tap target to the tap. The operations may include transmitting, storing, or displaying the symbol.

This and other aspects can each optionally include one or more of the following features. A first set of magnetic flux measurements may be received from a first magnetometer that is attached to the thumb of the user. A second set of magnetic flux measurements may be received from a second magnetometer that is attached to the wrist of the user. The orientation may be determined based at least in part on the first set of magnetic flux measurements and the second set of magnetic flux measurements. Determining the orientation may include filtering the first set acceleration measurements to determine a first estimate of acceleration experienced by the first accelerometer while the thumb was at rest with respect to a hand of the user on the tap target; filtering the second set of acceleration measurements to determine a second estimate of acceleration experienced by the second accelerometer while the thumb was at rest with respect to the hand of the user on the tap target; filtering the first set magnetic flux measurements to determine a first estimate of magnetic flux experienced by the first magnetometer while the thumb was at rest with respect to the hand of the user on the tap target; filtering the second set of magnetic flux measurements to determine a second estimate of magnetic flux experienced by the second accelerometer while the thumb was at rest with respect to the hand of the user on the tap target; and determining a rotation that will approximately align the first estimate of acceleration with the second estimate of acceleration and that also will approximately align the first estimate of magnetic flux with the second estimate of magnetic flux. A first set of angular rate measurements may be received from a first gyroscope that is attached to the thumb of the user. A second set of angular rate measurements may be received from a second gyroscope that is attached to the wrist of the user. The orientation may be determined based at least in part on first set of angular rate measurements and the second set of angular rate measurements. Determining the orientation may include integrating the first set of acceleration measurements and the first set of angular rate measurements to determine a first estimate of an orientation, with respect to a reference position, of the first accelerometer at a time during the tap; integrating the second set of acceleration measurements and the second set of angular rate measurements to determine a second estimate of an orientation, with respect to a reference position, of the second accelerometer at the time during the tap; and comparing the first estimate of the orientation of the first accelerometer to the second estimate of the orientation of the second accelerometer. An estimate may be determined, based on the second set of acceleration measurements, of an orientation of an acceleration experienced by the second accelerometer with respect to the axes of the second accelerometer during the tap. Assigning the symbol to the tap may include selecting the symbol from among a plurality of symbols associated with the tap target based on the orientation of the acceleration experienced by the second accelerometer. The acceleration experienced by the second accelerometer may be dominated by acceleration caused by the gravitational force of the Earth and the selection may be made based at least in part on an estimate of an angle between the gravitational acceleration and an axis running approximately parallel to a forearm of the user. The user may be enabled to indicate a choice from among the plurality of the symbols associated with the tap target, by adjusting the angle of wrist or the angle of a forearm of the user with respect to the gravitational force of the Earth during the tap. The user may be enabled to turn a palm side of the wrist down to face towards the Earth to enter a cursor manipulation mode, in which acceleration measurements from the second accelerometer are used to move a cursor in a virtual space. Determining the orientation may include filtering the first set of acceleration measurements to determine an estimate of a deceleration vector caused by the impact of the thumb with the tap target.

In a fourth aspect, in general, the subject matter described in this specification can be embodied in systems that include a wireless network interface configured to receive a first set of acceleration measurements from a first accelerometer that is attached to a thumb of a user. The systems may include a wireless network interface configured to receive a second set of acceleration measurements from a second accelerometer that is attached to a wrist of the user. The systems may include a module configured to detect, based at least in part on the first set of acceleration measurements, when the thumb is tapped on a surface. The systems may include a module configured to, when a tap of the thumb is detected, determine, based at least in part on the first set of acceleration measurements and the second set of acceleration measurements, an orientation of the first accelerometer relative to the second accelerometer. The systems may include a module configured to identify, based on the orientation, a tap target, from among a plurality of tap targets located on fingers of the user, that was touched during the tap. The systems may include a module configured to assign a symbol associated with the tap target to the tap. The systems may include a module configured to transmit, store, or display the symbol.

This and other aspects can each optionally include one or more of the following features. A first set of magnetic flux measurements may be received from a first magnetometer that is attached to the thumb of the user. A second set of magnetic flux measurements may be received from a second magnetometer that is attached to the wrist of the user. The orientation may be determined based at least in part on the first set of magnetic flux measurements and the second set of magnetic flux measurements. Determining the orientation may include filtering the first set acceleration measurements to determine a first estimate of acceleration experienced by the first accelerometer while the thumb was at rest with respect to a hand of the user on the tap target; filtering the second set of acceleration measurements to determine a second estimate of acceleration experienced by the second accelerometer while the thumb was at rest with respect to the hand of the user on the tap target; filtering the first set magnetic flux measurements to determine a first estimate of magnetic flux experienced by the first magnetometer while the thumb was at rest with respect to the hand of the user on the tap target; filtering the second set of magnetic flux measurements to determine a second estimate of magnetic flux experienced by the second accelerometer while the thumb was at rest with respect to the hand of the user on the tap target; and determining a rotation that will approximately align the first estimate of acceleration with the second estimate of acceleration and that also will approximately align the first estimate of magnetic flux with the second estimate of magnetic flux. A first set of angular rate measurements may be received from a first gyroscope that is attached to the thumb of the user. A second set of angular rate measurements may be received from a second gyroscope that is attached to the wrist of the user. The orientation may be determined based at least in part on first set of angular rate measurements and the second set of angular rate measurements. Determining the orientation may include integrating the first set of acceleration measurements and the first set of angular rate measurements to determine a first estimate of an orientation, with respect to a reference position, of the first accelerometer at a time during the tap; integrating the second set of acceleration measurements and the second set of angular rate measurements to determine a second estimate of an orientation, with respect to a reference position, of the second accelerometer at the time during the tap; and comparing the first estimate of the orientation of the first accelerometer to the second estimate of the orientation of the second accelerometer. An estimate may be determined, based on the second set of acceleration measurements, of an orientation of an acceleration experienced by the second accelerometer with respect to the axes of the second accelerometer during the tap. Assigning the symbol to the tap may include selecting the symbol from among a plurality of symbols associated with the tap target based on the orientation of the acceleration experienced by the second accelerometer. The acceleration experienced by the second accelerometer may be dominated by acceleration caused by the gravitational force of the Earth and the selection may be made based at least in part on an estimate of an angle between the gravitational acceleration and an axis running approximately parallel to a forearm of the user. The user may be enabled to indicate a choice from among the plurality of the symbols associated with the tap target, by adjusting the angle of wrist or the angle of a forearm of the user with respect to the gravitational force of the Earth during the tap. The user may be enabled to turn a palm side of the wrist down to face towards the Earth to enter a cursor manipulation mode, in which acceleration measurements from the second accelerometer are used to move a cursor in a virtual space. Determining the orientation may include filtering the first set of acceleration measurements to determine an estimate of a deceleration vector caused by the impact of the thumb with the tap target.

In a fifth aspect, in general, the subject matter described in this specification can be embodied in one or more computer-readable storage media encoded with a computer program. The computer program may include instructions that when executed by data a processing apparatus cause the data processing apparatus to perform operations including receiving a first set of acceleration measurements from a first accelerometer that is attached to a thumb of a user. The operations may include receiving a second set of acceleration measurements from a second accelerometer that is attached to a wrist of the user. The operations may include detecting, based at least in part on the first set of acceleration measurements, when the thumb is tapped on a surface. The operations may include when a tap of the thumb is detected, determining, based at least in part on the first set of acceleration measurements and the second set of acceleration measurements, an orientation of the first accelerometer relative to the second accelerometer. The operations may include identifying, based on the orientation, a tap target, from among a plurality of tap targets located on fingers of the user, that was touched during the tap. The operations may include assigning a symbol associated with the tap target to the tap. The operations may include transmitting, storing, or displaying the symbol.

This and other aspects can each optionally include one or more of the following features. A first set of magnetic flux measurements may be received from a first magnetometer that is attached to the thumb of the user. A second set of magnetic flux measurements may be received from a second magnetometer that is attached to the wrist of the user. The orientation may be determined based at least in part on the first set of magnetic flux measurements and the second set of magnetic flux measurements. Determining the orientation may include filtering the first set acceleration measurements to determine a first estimate of acceleration experienced by the first accelerometer while the thumb was at rest with respect to a hand of the user on the tap target; filtering the second set of acceleration measurements to determine a second estimate of acceleration experienced by the second accelerometer while the thumb was at rest with respect to the hand of the user on the tap target; filtering the first set magnetic flux measurements to determine a first estimate of magnetic flux experienced by the first magnetometer while the thumb was at rest with respect to the hand of the user on the tap target; filtering the second set of magnetic flux measurements to determine a second estimate of magnetic flux experienced by the second accelerometer while the thumb was at rest with respect to the hand of the user on the tap target; and determining a rotation that will approximately align the first estimate of acceleration with the second estimate of acceleration and that also will approximately align the first estimate of magnetic flux with the second estimate of magnetic flux. A first set of angular rate measurements may be received from a first gyroscope that is attached to the thumb of the user. A second set of angular rate measurements may be received from a second gyroscope that is attached to the wrist of the user. The orientation may be determined based at least in part on first set of angular rate measurements and the second set of angular rate measurements. Determining the orientation may include integrating the first set of acceleration measurements and the first set of angular rate measurements to determine a first estimate of an orientation, with respect to a reference position, of the first accelerometer at a time during the tap; integrating the second set of acceleration measurements and the second set of angular rate measurements to determine a second estimate of an orientation, with respect to a reference position, of the second accelerometer at the time during the tap; and comparing the first estimate of the orientation of the first accelerometer to the second estimate of the orientation of the second accelerometer. An estimate may be determined, based on the second set of acceleration measurements, of an orientation of an acceleration experienced by the second accelerometer with respect to the axes of the second accelerometer during the tap. Assigning the symbol to the tap may include selecting the symbol from among a plurality of symbols associated with the tap target based on the orientation of the acceleration experienced by the second accelerometer. The acceleration experienced by the second accelerometer may be dominated by acceleration caused by the gravitational force of the Earth and the selection may be made based at least in part on an estimate of an angle between the gravitational acceleration and an axis running approximately parallel to a forearm of the user. The user may be enabled to indicate a choice from among the plurality of the symbols associated with the tap target, by adjusting the angle of wrist or the angle of a forearm of the user with respect to the gravitational force of the Earth during the tap. The user may be enabled to turn a palm side of the wrist down to face towards the Earth to enter a cursor manipulation mode, in which acceleration measurements from the second accelerometer are used to move a cursor in a virtual space. Determining the orientation may include filtering the first set of acceleration measurements to determine an estimate of a deceleration vector caused by the impact of the thumb with the tap target.

In a sixth aspect, in general, the subject matter described in this specification can be embodied in systems that include a ring band, a first accelerometer attached to the ring band, a first magnetometer attached to the ring band, a wrist band, a second accelerometer attached to the wrist band, and a second magnetometer attached to the wrist band.

This and other aspects can each optionally include one or more of the following features. The systems may include a gyroscope attached to the wrist band. The systems may include a gyroscope attached to the ring band. The systems may include a wireless transmitter attached to the wrist band. The systems may include a wireless transmitter attached to the ring band. The systems may include two or more wire connecting the ring band to the wrist band. The systems may include a processing device attached to the wrist band. The processing device may be a micro-controller. The processing device may be a microprocessor. The systems may include a processing device attached to the ring band.

In a seventh aspect, in general, the subject matter described in this specification can be embodied in systems that include a ring band, a first accelerometer attached to the ring band, a first magnetometer attached to the ring band, a wrist band, a second accelerometer attached to the wrist band, a second magnetometer attached to the wrist band, and a processor configured to receive sensor readings from the first accelerometer, the first magnetometer, the second accelerometer, and the second magnetometer and to detect hand gestures based on these received sensor readings.

This and other aspects can each optionally include one or more of the following features. Detecting hand gestures may include calculating the orientation of the first accelerometer relative to the second accelerometer. Detecting hand gestures may include calculating the orientation of the first accelerometer relative to the second accelerometer. Detecting hand gestures may include calculating the orientation of the first magnetometer relative to the second magnetometer.

In an eighth aspect, in general, the subject matter described in this specification can be embodied in methods that include attaching a first sensor component to a first body part so that the sensor component is held in a fixed orientation with respect to the first body part and attaching a second sensor component to a second body part so that the sensor component is held in a fixed orientation with respect to the second body part. The methods may include receiving signal from the first sensor component reflecting readings from a sensor in the first sensor component and receiving signal from the second sensor component reflecting readings from a sensor in the second sensor component. The methods may include estimating the relative orientation of the first sensor component and the second sensor component based in part on the readings from the sensors in the first and second sensor components.

This and other aspects can each optionally include one or more of the following features. The first sensor component may include an accelerometer and a magnetometer, the second sensor component may include an accelerometer and a magnetometer, and the sensor readings may include acceleration measurements and magnetic flux measurements from the first sensor component and the second sensor component. The first sensor component may include an accelerometer and a gyroscope, the second sensor component may include an accelerometer and a gyroscope, and the sensor readings may include acceleration measurements and angular rate measurements from the first sensor component and the second sensor component.

In a ninth aspect, in general, the subject matter described in this specification can be embodied in systems that include a fastening article for attaching a first sensor component to a first body part so that the sensor component is held in a fixed orientation with respect to the first body part and a fastening article for attaching a second sensor component to a second body part so that the sensor component is held in a fixed orientation with respect to the second body part. The systems may include a wireless networking interface for receiving signal from the first sensor component reflecting readings from a sensor in the first sensor component and receiving signal from the second sensor component reflecting readings from a sensor in the second sensor component. The systems may include a module configured to estimate the relative orientation of the first sensor component and the second sensor component based in part on the readings from the sensors in the first and second sensor components.

This and other aspects can each optionally include one or more of the following features. The first sensor component may include an accelerometer and a magnetometer, the second sensor component may include an accelerometer and a magnetometer, and the sensor readings may include acceleration measurements and magnetic flux measurements from the first sensor component and the second sensor component. The first sensor component may include an accelerometer and a gyroscope, the second sensor component may include an accelerometer and a gyroscope, and the sensor readings may include acceleration measurements and angular rate measurements from the first sensor component and the second sensor component.

In a tenth aspect, in general, the subject matter described in this specification can be embodied in systems that include a ring band, a first accelerometer attached to the ring band, a fastening article configured to hold an object in a fixed orientation with respect to the hand or forearm of a user, and a second accelerometer attached to a fastening article.

This and other aspects can each optionally include one or more of the following features. The systems may include a gyroscope attached to the first fastening article. The systems may include a gyroscope attached to the second fastening article. The systems may include a wireless transmitter attached to the first fastening article. The systems may include a wireless transmitter attached to the second fastening article. The systems may include two or more wire connecting the first fastening article to the second fastening article. The systems may include a processing device attached to the second fastening article The processing device may be a micro-controller. The processing device may be a microprocessor. The systems may include a processing device attached to the first fastening article.

In an eleventh aspect, in general, the subject matter described in this specification can be embodied in systems that include an accelerometer, a transmitter connected to the accelerometer and configured to transmit information derived from the accelerometer to an external processing device, and a ring band connected to the accelerometer that is capable of holding the accelerometer in place on a thumb of a user.

This and other aspects can each optionally include one or more of the following features. The systems may include a gyroscope connected to the ring band. The systems may include a processing device attached to the ring band. The processing device may be a micro-controller. The processing device may be a microprocessor. The systems may include a receiver configured to receive configuration commands from the external processing device.

In a twelfth aspect, in general, the subject matter described in this specification can be embodied in systems that include a first accelerometer, a first transmitter connected to the first accelerometer and configured to transmit information derived from the first accelerometer to an external processing device, a ring band connected to the first accelerometer that is capable of holding the first accelerometer in place on a finger of a user, a second accelerometer; a second transmitter connected to the second accelerometer and configured to transmit information derived from the second accelerometer to the external processing device, and a wrist band connected to the second accelerometer that is capable of holding the second accelerometer in place on the wrist of a user.

This and other aspects can each optionally include one or more of the following features. The systems may include a magnetometer attached to the wrist band. The systems may include a magnetometer attached to the ring band. The systems may include a gyroscope attached to the wrist band. The systems may include a gyroscope attached to the ring band. The systems may include a wireless transmitter attached to the wrist band. The systems may include a wireless transmitter attached to the ring band. The systems may include two or more wire connecting the ring band to the wrist band. The systems may include a processing device attached to the wrist band. The processing device may be a micro-controller. The processing device may be a microprocessor. The systems may include a processing device attached to the ring band.

In a thirteenth aspect, in general, the subject matter described in this specification can be embodied in methods that include affixing two or more sensors to fingers and wrists, wherein signals from the sensors are processed to determine locations of movement in two-dimensional or three-dimension space and to determine locations of taps in two-dimensional or three-dimensional space.

In a fourteenth aspect, in general, the subject matter described in this specification can be embodied in methods that include affixing a first accelerometer to the thumb of a user and affixing a second accelerometer to a reference location on the same hand or wrist of the user. The methods may include processing signals from the first accelerometer to detect taps of the user thumb and processing signals from the first and second accelerometers to determine which of a plurality of target locations on the hand was tapped by the thumb upon detection of a tap.

This and other aspects can each optionally include one or more of the following features. Signals from the second accelerometer may be processed to determine the orientation of the user hand in relation to the radius of the earth. A value may be selecting among a plurality of values assigned to tap targets based in part on the orientation of the hand to the radius of the earth at the time of the taps. Processing of signals from the first and second accelerometers may include tracking the change in position of the first accelerometer relative to the second accelerometer. Processing of signals from the first and second accelerometers may include determining an angle between vectors emanating from the first accelerometer and the second accelerometer. Processing of signals from the first and second accelerometers may include determining a linear displacement of either the first or second accelerometers between two time points. The methods may include affixing a first magnetometer to the thumb of a user and affixing a second magnetometer to a reference location on the same hand or wrist of the user. Signals from the first and second magnetometers may be processed to determine which of a plurality of target locations on the hand was tapped by the thumb upon detection of a tap. The methods may include affixing a first gyroscope to the thumb of a user and affixing a second gyroscope to a reference location on the same hand or wrist of the user. Signals from the first and second gyroscopes may be processed to determine which of a plurality of target locations on the hand was tapped by the thumb upon detection of a tap.

In a fifteenth aspect, in general, the subject matter described in this specification can be embodied in systems that include a first accelerometer and a first fastening article attached to the first accelerometer, the first fastening article capable of holding the first accelerometer in place on a portion of a thumb of a user. The systems that include a second accelerometer and a second fastening article attached to the second accelerometer, the second fastening article capable of holding the second accelerometer in place on a portion of a wrist of a user. The systems that include a processing device receiving data based on acceleration measurements from the first accelerometer and the second accelerometer via one or more wireless communication links. The systems that include a visual gesture recognition device connected to the processing device, which is configured to incorporate the data with image data to identify gestures.

In a sixteenth aspect, in general, the subject matter described in this specification can be embodied in systems that include a first accelerometer and a first fastening article attached to the first accelerometer, the first fastening article capable of holding the first accelerometer in place on a portion of a thumb of a user. The systems may include a second accelerometer and a second fastening article attached to the second accelerometer, the second fastening article capable of holding the second accelerometer in place on a portion of a wrist of a user. The systems may include a processing device receiving data based on acceleration measurements from the first accelerometer and the second accelerometer via one or more wireless communication links. The systems may include a projector connected to the processing device, the projector configured to project images produced by the processing device and wherein the images including graphic representations of symbols selected based the data.

In a seventeenth aspect, in general, the subject matter described in this specification can be embodied in methods that include detecting an instance of a gesture made with a hand, wherein the gesture is associated with a plurality of symbols. The methods may include estimating a first angle between a first axis that is approximately parallel to a forearm of the hand and an acceleration experienced by an accelerometer attached to the forearm. The methods may include assigning one of the plurality of symbols to the instance of the gesture based in part on the estimate of the first angle.

This and other aspects can each optionally include one or more of the following features. The acceleration may be caused by gravitational force of the Earth. A second angle between a second axis and the acceleration experienced by the accelerometer attached to the forearm may be estimated, where the second axis is approximately perpendicular to the first axis. The instance of the gesture may be associated with one of the plurality of symbols based in part on the estimate of the second angle.

In an eighteenth aspect, in general, the subject matter described in this specification can be embodied in systems that include a data processing apparatus and a data storage device storing instructions executable by the data processing apparatus that upon execution by the data processing apparatus cause the data processing apparatus to perform operations including detecting an instance of a gesture made with a hand, wherein the gesture is associated with a plurality of symbols. The operations may include estimating a first angle between a first axis that is approximately parallel to a forearm of the hand and an acceleration experienced by an accelerometer attached to the forearm. The operations may include assigning one of the plurality of symbols to the instance of the gesture based in part on the estimate of the first angle.

This and other aspects can each optionally include one or more of the following features. The acceleration may be caused by gravitational force of the Earth. A second angle between a second axis and the acceleration experienced by the accelerometer attached to the forearm may be estimated, where the second axis is approximately perpendicular to the first axis. The instance of the gesture may be associated with one of the plurality of symbols based in part on the estimate of the second angle.

In a nineteenth aspect, in general, the subject matter described in this specification can be embodied in systems that include a module configured to detect an instance of a gesture made with a hand, wherein the gesture is associated with a plurality of symbols. The systems may include a module configured to estimate a first angle between a first axis that is approximately parallel to a forearm of the hand and an acceleration experienced by an accelerometer attached to the forearm. The systems may include a module configured to assign one of the plurality of symbols to the instance of the gesture based in part on the estimate of the first angle.

This and other aspects can each optionally include one or more of the following features. The acceleration may be caused by gravitational force of the Earth. A second angle between a second axis and the acceleration experienced by the accelerometer attached to the forearm may be estimated, where the second axis is approximately perpendicular to the first axis. The instance of the gesture may be associated with one of the plurality of symbols based in part on the estimate of the second angle.

In a twentieth aspect, in general, the subject matter described in this specification can be embodied in one or more computer-readable storage media encoded with a computer program. The computer program may include instructions that when executed by data a processing apparatus cause the data processing apparatus to perform operations including detecting an instance of a gesture made with a hand, wherein the gesture is associated with a plurality of symbols. The operations may include estimating a first angle between a first axis that is approximately parallel to a forearm of the hand and an acceleration experienced by an accelerometer attached to the forearm. The operations may include assigning one of the plurality of symbols to the instance of the gesture based in part on the estimate of the first angle.

This and other aspects can each optionally include one or more of the following features. The acceleration may be caused by gravitational force of the Earth. A second angle between a second axis and the acceleration experienced by the accelerometer attached to the forearm may be estimated, where the second axis is approximately perpendicular to the first axis. The instance of the gesture may be associated with one of the plurality of symbols based in part on the estimate of the second angle.

In a twenty-first aspect, in general, the subject matter described in this specification can be embodied in methods that include detecting an instance of a gesture made with a hand, wherein the gesture is associated with a plurality of symbols. The methods may include estimating an angle between an axis that is approximately perpendicular to a forearm of the hand and an acceleration experienced by an accelerometer attached to the forearm. The methods may include assigning one of the plurality of symbols to the instance of the gesture based in part on the estimate of the angle.

This and other aspects can each optionally include one or more of the following features. The acceleration may be caused by gravitational force of the Earth. A second angle between an acceleration experienced by an accelerometer attached to the forearm and a second axis that is also approximately perpendicular to a forearm of the hand may be estimated. The one of the plurality of symbols may be assigned to the instance of the gesture based in part on the estimate of the second angle.

In a twenty-second aspect, in general, the subject matter described in this specification can be embodied in systems that include a data processing apparatus and a data storage device storing instructions executable by the data processing apparatus that upon execution by the data processing apparatus cause the data processing apparatus to perform operations including detecting an instance of a gesture made with a hand, wherein the gesture is associated with a plurality of symbols. The operations may include estimating an angle between an axis that is approximately perpendicular to a forearm of the hand and an acceleration experienced by an accelerometer attached to the forearm. The operations may include assigning one of the plurality of symbols to the instance of the gesture based in part on the estimate of the angle.

This and other aspects can each optionally include one or more of the following features. The acceleration may be caused by gravitational force of the Earth. A second angle between an acceleration experienced by an accelerometer attached to the forearm and a second axis that is also approximately perpendicular to a forearm of the hand may be estimated. The one of the plurality of symbols may be assigned to the instance of the gesture based in part on the estimate of the second angle.

In a twenty-third aspect, in general, the subject matter described in this specification can be embodied in systems that include a module configured to detect an instance of a gesture made with a hand, wherein the gesture is associated with a plurality of symbols. The systems may include a module configured to estimate an angle between an axis that is approximately perpendicular to a forearm of the hand and an acceleration experienced by an accelerometer attached to the forearm. The systems may include a module configured to assign one of the plurality of symbols to the instance of the gesture based in part on the estimate of the angle.

This and other aspects can each optionally include one or more of the following features. The acceleration may be caused by gravitational force of the Earth. A second angle between an acceleration experienced by an accelerometer attached to the forearm and a second axis that is also approximately perpendicular to a forearm of the hand may be estimated. The one of the plurality of symbols may be assigned to the instance of the gesture based in part on the estimate of the second angle.

In a twenty-fourth aspect, in general, the subject matter described in this specification can be embodied in one or more computer-readable storage media encoded with a computer program. The computer program may include instructions that when executed by data a processing apparatus cause the data processing apparatus to perform operations including detecting an instance of a gesture made with a hand, wherein the gesture is associated with a plurality of symbols. The operations may include estimating an angle between an axis that is approximately perpendicular to a forearm of the hand and an acceleration experienced by an accelerometer attached to the forearm. The operations may include assigning one of the plurality of symbols to the instance of the gesture based in part on the estimate of the angle.

This and other aspects can each optionally include one or more of the following features. The acceleration may be caused by gravitational force of the Earth. A second angle between an acceleration experienced by an accelerometer attached to the forearm and a second axis that is also approximately perpendicular to a forearm of the hand may be estimated. The one of the plurality of symbols may be assigned to the instance of the gesture based in part on the estimate of the second angle.

In a twenty-fifth aspect, in general, the subject matter described in this specification can be embodied in methods that include receiving a first set of sensor measurements from a first sensor module that is attached to a thumb of a user, wherein the first sensor module comprises an accelerometer and the first set of sensor measurements includes acceleration measurements. The methods may include receiving a second set of sensor measurements from a second sensor module that is attached to a wrist of the user, wherein the second sensor module includes an accelerometer and the second set of sensor measurements includes acceleration measurements. The methods may include determining, based at least in part on the first set of measurements and the second set of measurements, an orientation of the thumb relative to the wrist. The methods may include detecting, based at least in part on acceleration measurements in the second set of sensor measurements, when a hand of the user is moved. The methods may include, when the orientation satisfies a condition and movement of the hand is detected, moving a cursor in a virtual space in a direction and by an amount determined based at least in part on acceleration measurements in the second set of sensor measurements. The methods may include causing the motion of the cursor in the virtual space to be reflected in a visual representation of the virtual space that is presented on a display.

This and other aspects can each optionally include one or more of the following features. The condition may require the angle between an axis of a sensor in the first sensor module that is approximately parallel to a portion of the thumb and an axis of a sensor in the second sensor module that is approximately parallel a forearm of the user to be below a threshold. Tap events may be detected, based on the first set of sensor measurements and the second set of sensor measurements, when the thumb taps a tap target located on another finger of the hand. Detection of a thumb tap on the tap target may cause an interaction with an object in the virtual space that the cursor is in contact with. The second sensor module may include a gyroscope and the second set of sensor measurements may include angular rate measurements. A gesture may be detected based on the first set of sensor measurements and the second set of sensor measurements, the gesture indicating a selection of an object in the virtual space that the cursor is in contact with. The selected object in virtual space may be rotated, based at least in part on the angular rate measurements in the second set of sensor measurements. The second sensor module may include a magnetometer and the second set of sensor measurements may include magnetic flux measurements. A gesture may be detected based on the first set of sensor measurements and the second set of sensor measurements, the gesture indicating a selection of an object in the virtual space that the cursor is in contact with. The object in virtual space may be rotated, based at least in part on acceleration measurements and magnetic flux measurements in the second set of sensor measurements. The first sensor module may include a magnetometer and the first set of sensor measurements may include magnetic flux measurements and the second sensor module may include a magnetometer and the second set of sensor measurements may include magnetic flux measurements. Determining the orientation may include determining, based on the first set of sensor measurements, a first estimate of orientation of the first sensor module relative to a gravitational field and a magnetic field; determining, based on the second set of sensor measurements, a second estimate of orientation of the second sensor module relative to a gravitational field and a magnetic field; and comparing the first estimate of orientation to the second estimate if orientation. The first sensor module may include a gyroscope and the first set of sensor measurements may include angular rate measurements and the second sensor module may include a gyroscope and the second set of sensor measurements may include angular rate measurements. Determining the orientation may include determining, based on the first set of sensor measurements, a first estimate of orientation of the first sensor module relative to a reference orientation; determining, based on the second set of sensor measurements, a second estimate of orientation of the second sensor module relative to a reference orientation; and comparing the first estimate of orientation to the second estimate if orientation.

In a twenty-sixth aspect, in general, the subject matter described in this specification can be embodied in systems that include a data processing apparatus and a data storage device storing instructions executable by the data processing apparatus that upon execution by the data processing apparatus cause the data processing apparatus to perform operations including receiving a first set of sensor measurements from a first sensor module that is attached to a thumb of a user, wherein the first sensor module comprises an accelerometer and the first set of sensor measurements includes acceleration measurements. The operations may include receiving a second set of sensor measurements from a second sensor module that is attached to a wrist of the user, wherein the second sensor module includes an accelerometer and the second set of sensor measurements includes acceleration measurements. The operations may include determining, based at least in part on the first set of measurements and the second set of measurements, an orientation of the thumb relative to the wrist. The operations may include detecting, based at least in part on acceleration measurements in the second set of sensor measurements, when a hand of the user is moved. The operations may include, when the orientation satisfies a condition and movement of the hand is detected, moving a cursor in a virtual space in a direction and by an amount determined based at least in part on acceleration measurements in the second set of sensor measurements. The operations may include causing the motion of the cursor in the virtual space to be reflected in a visual representation of the virtual space that is presented on a display.

This and other aspects can each optionally include one or more of the following features. The condition may require the angle between an axis of a sensor in the first sensor module that is approximately parallel to a portion of the thumb and an axis of a sensor in the second sensor module that is approximately parallel a forearm of the user to be below a threshold. Tap events may be detected, based on the first set of sensor measurements and the second set of sensor measurements, when the thumb taps a tap target located on another finger of the hand. Detection of a thumb tap on the tap target may cause an interaction with an object in the virtual space that the cursor is in contact with. The second sensor module may include a gyroscope and the second set of sensor measurements may include angular rate measurements. A gesture may be detected based on the first set of sensor measurements and the second set of sensor measurements, the gesture indicating a selection of an object in the virtual space that the cursor is in contact with. The selected object in virtual space may be rotated, based at least in part on the angular rate measurements in the second set of sensor measurements. The second sensor module may include a magnetometer and the second set of sensor measurements may include magnetic flux measurements. A gesture may be detected based on the first set of sensor measurements and the second set of sensor measurements, the gesture indicating a selection of an object in the virtual space that the cursor is in contact with. The object in virtual space may be rotated, based at least in part on acceleration measurements and magnetic flux measurements in the second set of sensor measurements. The first sensor module may include a magnetometer and the first set of sensor measurements may include magnetic flux measurements and the second sensor module may include a magnetometer and the second set of sensor measurements may include magnetic flux measurements. Determining the orientation may include determining, based on the first set of sensor measurements, a first estimate of orientation of the first sensor module relative to a gravitational field and a magnetic field; determining, based on the second set of sensor measurements, a second estimate of orientation of the second sensor module relative to a gravitational field and a magnetic field; and comparing the first estimate of orientation to the second estimate if orientation. The first sensor module may include a gyroscope and the first set of sensor measurements may include angular rate measurements and the second sensor module may include a gyroscope and the second set of sensor measurements may include angular rate measurements. Determining the orientation may include determining, based on the first set of sensor measurements, a first estimate of orientation of the first sensor module relative to a reference orientation; determining, based on the second set of sensor measurements, a second estimate of orientation of the second sensor module relative to a reference orientation; and comparing the first estimate of orientation to the second estimate if orientation.

In a twenty-seventh aspect, in general, the subject matter described in this specification can be embodied in systems that include a wireless networking interface configured to receive a first set of sensor measurements from a first sensor module that is attached to a thumb of a user, wherein the first sensor module includes an accelerometer and the first set of sensor measurements includes acceleration measurements. The systems may include a wireless networking interface configured to receive a second set of sensor measurements from a second sensor module that is attached to a wrist of the user, wherein the second sensor module includes an accelerometer and the second set of sensor measurements includes acceleration measurements. The systems may include a module configured to determine, based at least in part on the first set of measurements and the second set of measurements, an orientation of the thumb relative to the wrist. The systems may include a module configured to detect, based at least in part on acceleration measurements in the second set of sensor measurements, when a hand of the user is moved. The systems may include a module configured to, when the orientation satisfies a condition and movement of the hand is detected, move a cursor in a virtual space in a direction and by an amount determined based at least in part on acceleration measurements in the second set of sensor measurements. The systems may include a module configured to cause the motion of the cursor in the virtual space to be reflected in a visual representation of the virtual space that is presented on a display.

This and other aspects can each optionally include one or more of the following features. The condition may require the angle between an axis of a sensor in the first sensor module that is approximately parallel to a portion of the thumb and an axis of a sensor in the second sensor module that is approximately parallel a forearm of the user to be below a threshold. Tap events may be detected, based on the first set of sensor measurements and the second set of sensor measurements, when the thumb taps a tap target located on another finger of the hand. Detection of a thumb tap on the tap target may cause an interaction with an object in the virtual space that the cursor is in contact with. The second sensor module may include a gyroscope and the second set of sensor measurements may include angular rate measurements. A gesture may be detected based on the first set of sensor measurements and the second set of sensor measurements, the gesture indicating a selection of an object in the virtual space that the cursor is in contact with. The selected object in virtual space may be rotated, based at least in part on the angular rate measurements in the second set of sensor measurements. The second sensor module may include a magnetometer and the second set of sensor measurements may include magnetic flux measurements. A gesture may be detected based on the first set of sensor measurements and the second set of sensor measurements, the gesture indicating a selection of an object in the virtual space that the cursor is in contact with. The object in virtual space may be rotated, based at least in part on acceleration measurements and magnetic flux measurements in the second set of sensor measurements. The first sensor module may include a magnetometer and the first set of sensor measurements may include magnetic flux measurements and the second sensor module may include a magnetometer and the second set of sensor measurements may include magnetic flux measurements. Determining the orientation may include determining, based on the first set of sensor measurements, a first estimate of orientation of the first sensor module relative to a gravitational field and a magnetic field; determining, based on the second set of sensor measurements, a second estimate of orientation of the second sensor module relative to a gravitational field and a magnetic field; and comparing the first estimate of orientation to the second estimate if orientation. The first sensor module may include a gyroscope and the first set of sensor measurements may include angular rate measurements and the second sensor module may include a gyroscope and the second set of sensor measurements may include angular rate measurements. Determining the orientation may include determining, based on the first set of sensor measurements, a first estimate of orientation of the first sensor module relative to a reference orientation; determining, based on the second set of sensor measurements, a second estimate of orientation of the second sensor module relative to a reference orientation; and comparing the first estimate of orientation to the second estimate if orientation.

In a twenty-eighth aspect, in general, the subject matter described in this specification can be embodied in one or more computer-readable storage media encoded with a computer program. The computer program may include instructions that when executed by a data processing apparatus cause the data processing apparatus to perform operations including receiving a first set of sensor measurements from a first sensor module that is attached to a thumb of a user, wherein the first sensor module comprises an accelerometer and the first set of sensor measurements includes acceleration measurements. The operations may include receiving a second set of sensor measurements from a second sensor module that is attached to a wrist of the user, wherein the second sensor module includes an accelerometer and the second set of sensor measurements includes acceleration measurements. The operations may include determining, based at least in part on the first set of measurements and the second set of measurements, an orientation of the thumb relative to the wrist. The operations may include detecting, based at least in part on acceleration measurements in the second set of sensor measurements, when a hand of the user is moved. The operations may include, when the orientation satisfies a condition and movement of the hand is detected, moving a cursor in a virtual space in a direction and by an amount determined based at least in part on acceleration measurements in the second set of sensor measurements. The operations may include causing the motion of the cursor in the virtual space to be reflected in a visual representation of the virtual space that is presented on a display.

This and other aspects can each optionally include one or more of the following features. The condition may require the angle between an axis of a sensor in the first sensor module that is approximately parallel to a portion of the thumb and an axis of a sensor in the second sensor module that is approximately parallel a forearm of the user to be below a threshold. Tap events may be detected, based on the first set of sensor measurements and the second set of sensor measurements, when the thumb taps a tap target located on another finger of the hand. Detection of a thumb tap on the tap target may cause an interaction with an object in the virtual space that the cursor is in contact with. The second sensor module may include a gyroscope and the second set of sensor measurements may include angular rate measurements. A gesture may be detected based on the first set of sensor measurements and the second set of sensor measurements, the gesture indicating a selection of an object in the virtual space that the cursor is in contact with. The selected object in virtual space may be rotated, based at least in part on the angular rate measurements in the second set of sensor measurements. The second sensor module may include a magnetometer and the second set of sensor measurements may include magnetic flux measurements. A gesture may be detected based on the first set of sensor measurements and the second set of sensor measurements, the gesture indicating a selection of an object in the virtual space that the cursor is in contact with. The object in virtual space may be rotated, based at least in part on acceleration measurements and magnetic flux measurements in the second set of sensor measurements. The first sensor module may include a magnetometer and the first set of sensor measurements may include magnetic flux measurements and the second sensor module may include a magnetometer and the second set of sensor measurements may include magnetic flux measurements. Determining the orientation may include determining, based on the first set of sensor measurements, a first estimate of orientation of the first sensor module relative to a gravitational field and a magnetic field; determining, based on the second set of sensor measurements, a second estimate of orientation of the second sensor module relative to a gravitational field and a magnetic field; and comparing the first estimate of orientation to the second estimate if orientation. The first sensor module may include a gyroscope and the first set of sensor measurements may include angular rate measurements and the second sensor module may include a gyroscope and the second set of sensor measurements may include angular rate measurements. Determining the orientation may include determining, based on the first set of sensor measurements, a first estimate of orientation of the first sensor module relative to a reference orientation; determining, based on the second set of sensor measurements, a second estimate of orientation of the second sensor module relative to a reference orientation; and comparing the first estimate of orientation to the second estimate if orientation.

In a twenty-ninth aspect, in general, the subject matter described in this specification can be embodied in systems that include a first gyroscope; a first fastening article attached to the first gyroscope, the first fastening article capable of holding the first gyroscope in place on a portion of a thumb of a user; a second gyroscope; and a second fastening article attached to the second gyroscope, the second fastening article capable of holding the second gyroscope in place on a portion of a wrist of a user.

This and other aspects can each optionally include one or more of the following features. The first fastening article may be a ring band. The second fastening article may be a wrist band. A system may include a processing device configured to receive angular rate measurements from the first gyroscope and determine, based at least in part on the received angular rate measurements, when a thumb of a user wearing the first fastening article and the second fastening article has been tapped against a surface. The processing device may be further configured to receive angular rate measurements from the second gyroscope and, when a tap of the thumb is detected, determine, based at least in part on angular rate measurements from the first gyroscope and the second gyroscope, which tap target from among a set of tap targets located on fingers of a hand of the user have been tapped by the thumb. The processing device may be further configured to map the tap of the tap target to a symbol associated with the tap target. A system may include two or more wires that connect the first fastening device to the second fastening device. A system may include a wireless transmitter attached to the second fastening article, and the wireless transmitter may be configured to transmit data based on angular rate measurements from the second gyroscope to a computing device. A system may include a wireless transmitter attached to the second fastening article, and the wireless transmitter may be configured to transmit data based on angular rate measurements from the first gyroscope to a computing device. A system may include a display device configured to present images produced by the processing device and the images may include graphic representations of symbols selected based the data. The display device may be a liquid crystal display. The display device may be a projector. The processing device may be attached to the second fastening article. The processing device may be part of a remote computing device.

Implementations may include zero or more of the following advantages. Some implementations may reliably detect and classify hand gestures to allow a user to control a computing device. Some implementations may include sensor components that are comfortably wearable on a thumb and/or wrist of a user. Some implementations may enable a user to input alpha-numeric text or other symbols to a computing device. Some implementations may enable a user to manipulate a cursor in a two dimensional or a three dimensional virtual workspace. Some implementations may be robust to environmental noise such as vibrations or accelerations experienced in a moving vehicle. Some implementations may enable a user to enter text on mobile device without using limited display space to present keys. Some implementations may enable a user to enter symbols or commands to a computing device by tapping tap targets without looking at those targets.

The details of one or more examples are set forth in the accompanying drawings and the description below. Further features, aspects, and advantages of the disclosed invention will become apparent from the description, the drawings, and the claims.

DESCRIPTION OF THE DRAWINGS

FIG. 10A-10C are a table illustrating an example mapping of tap-target and hand-orientation pairs to distinct characters.

DETAILED DESCRIPTION

Figures 1, 2:
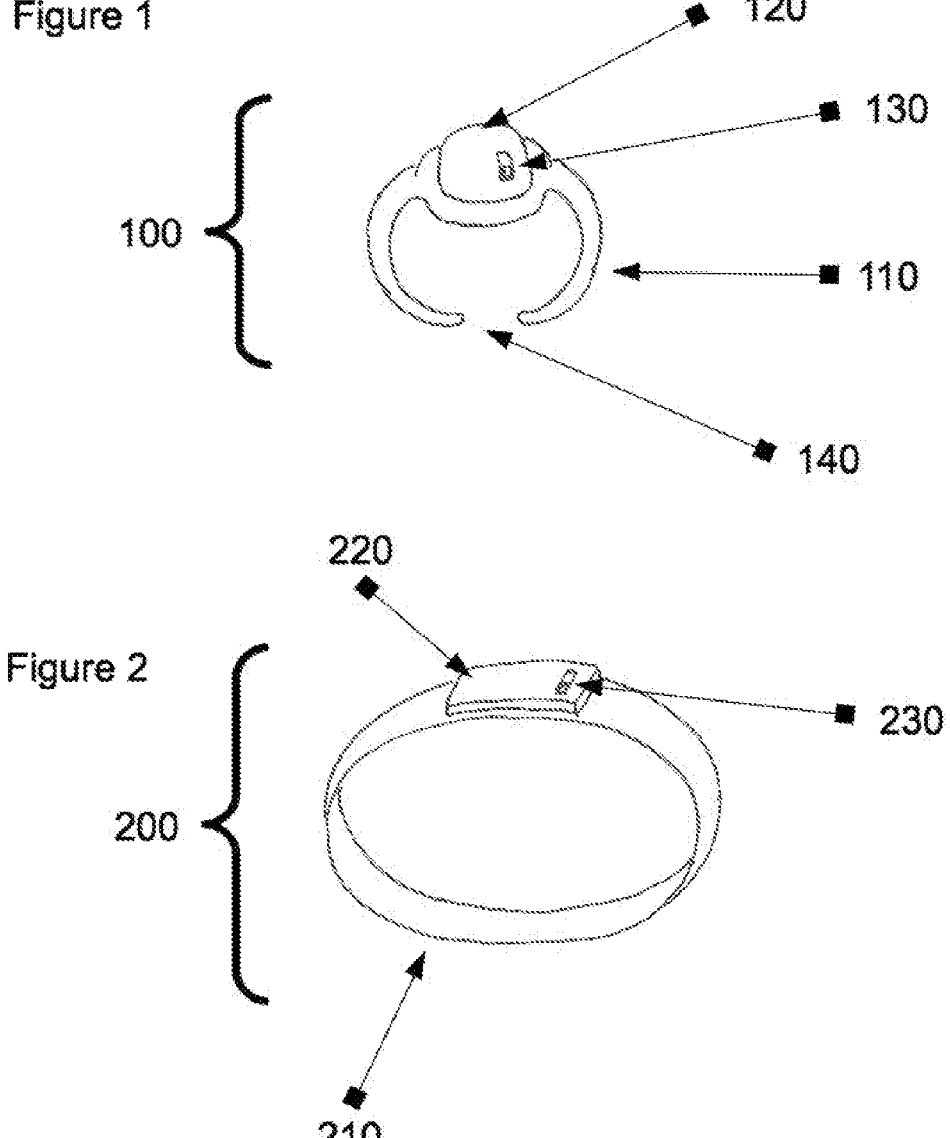
FIG. 1 is a drawing of an example interface ring.
FIG. 2 is a drawing of an example interface wrist band.

Computing interfaces are described for controlling a target computing device (e.g., a smart-phone, a tablet device, a laptop computer, a television, automobile environmental control system, or some other device that includes a microprocessor and accepts user input). In some implementations, a computer interface includes a sensor module that is attached to fastening article (e.g., a ring band, an adhesive substrate, or a glove with a thumb sleeve) that is capable of holding the sensor module in place on a portion of a thumb of a user. The sensor module may include an accelerometer, a magnetometer, and/or a gyroscope. In some implementations, a computing interface also includes a reference sensor module that may be attached to fastening article (e.g., a wrist band or sleeve) that is capable of holding the reference sensor module in place on a portion of the wrist of a user (or some other reference location on the hand or forearm of the user). A reference sensor module may include an accelerometer, a magnetometer, and/or a gyroscope.

A sensor module of a computing interface may also include a micro-controller or microprocessor, a wireless transmitter, and/or a battery. In some implementations, two sensor modules of an interface may be connected by two or more wires (e.g., a serial port cable), and only one of the sensor modules includes a battery that supplies power to both sensor modules.

In some implementations, each sensor module has its own battery and is configured to transmit measurements (e.g., acceleration measurements, magnetic flux measurements, and/or angular rate measurements) from one or more sensors in the sensor module to a remote computing device via a wireless communications link (e.g., a Bluetooth link). In some implementations, a sensor module transmits (e.g., via wireless communications link) its sensor measurements to another sensor module in the interface rather than directly to a remote computing device. Data based on sensor measurements from multiple sensor modules may be transmitted from one of the sensor modules (e.g., a reference sensor module attached to wrist) to a computing device that the user seeks to control or provide input to. For example, measurements from all the sensors in an interface may be forwarded to the target computing device via a transmitter (e.g., a Bluetooth transmitter) included in a reference sensor module. In some implementations, one of the sensor modules (a reference sensor module attached to wrist) includes a processing device (e.g., a micro-controller or a microprocessor) that analyzes sensor measurements from sensors of the interface and transmits other data based on those measurements to the target computing device. For example, symbols assigned to thumb taps detected by the interface may be transmitted to a target computing device.

In some implementations, processing to interpret the measurements from one or more sensors of an interface is performed by an application or device driver that runs on the target computing device.

Example processes are described for interpreting measurements from sensors in various interface configurations. The example interfaces with corresponding processes may enable a computing device to determine when a thumb of a user wearing an interface is tapped against a surface. For example, a user's thumb may be tapped against one of a set of configured tap targets on the other fingers of the user. These tap events may be detected and classified to identify which tap target was tapped and to map that tap gesture to a corresponding symbol that the user intends to input to the target computing device. In some implementations, the orientation of a user's wrist may be determined and used to select among multiple symbols assigned to an individual tap target.

In some implementations, an interface may support a cursor manipulation mode that enables a user to interact with objects in a virtual space (e.g., a two dimensional or three dimensional virtual space). For example, when in cursor manipulation mode, acceleration measurements from an accelerometer in the interface analyzed to control the movement of a cursor in the virtual space. In some implementations, angular rate measurements from a gyroscope in an interface may be interpreted to enable a user to rotate objects in virtual space that have been selected with a cursor while in a cursor manipulation mode.

Referring to FIG. 1, a computing interface may include a ring 100 that may be worn on a user's thumb. The ring includes a band 110 and one or more accelerometers, magnetometers, or gyroscopes (collectively, a set of sensors) that are located in an electronic component housing 120. The ring may include a single tri-axial or multiple dual-axis and /or single axis sensors to span the three dimensional space. In some implementations, the axes of different types of sensors in the component housing 120 may be aligned. In some implementations, the axes of different types of sensors in the component housing 120 may be aligned electronically via a calibration process. The ring may also include a radio frequency transmitting device, such as a Bluetooth transmitter, and a battery. The electronic component housing may include a switch 130 for powering the electronics components up and down.

The accelerometer may measure the spatial orientation of the thumb and its motion. For example, when the thumb is tapped against a target, such as phalanges on the other fingers of the hand, an abrupt deceleration results that is detected by the accelerometer. A transmitter may be used to send sensor measurements from the ring to an external processing device. A transmitter may also be used to send information about events derived from sensor measurements to an external processing device.

The ring band 110 serves to hold the interface ring 100 in place on a user's thumb. As thumb size may vary between users, it may be advantageous to make the ring band flexible enough to comfortably fit thumbs of different sizes. The ring band may be made of plastic, or another flexible material. The ring band may be of approximately circular shape with a single gap 140 that allows the ring band to flex to surround most of the circumference of a user's thumb. The ring band may alternatively be formed into a complete loop that completely encircles the user's thumb when worn. In this case the ring band may be made of a material, such as nylon, that is capable of stretching in a longitudinal direction. Alternatively the ring band may be rigid and fitted to a particular thumb size.

In some implementations, a ring 100 may also include a wireless receiver (e.g., a Bluetooth receiver) for receiving information from a target computing device or an intermediary device. For example, the ring may receive configuration commands from target computing device that set operating parameters of the ring, such as a usage mode (e.g., to enter a cursor control mode), a power-saving mode, a sampling rate for one or more sensors, etc.

In some implementations, a portion of the ring that includes a Bluetooth transmitter may be detachable from the band. This portion may also include a speaker and microphone that allow the detachable component to be used as a Bluetooth enabled earbud for a cellphone.

Referring to FIG. 2, an example computing interface may include a bracelet 200 that may be worn on a user's wrist. The bracelet includes a wristband 210 and one or more accelerometers, magnetometers, or gyroscopes (collectively, a set of sensors) that are located in an electronic component housing 220. The bracelet may include a single tri-axial or multiple dual-axis and /or single axis sensors to span the three dimensional space. In some implementations, the axes of different types of sensors in the component housing 220 may be aligned. In some implementations, the axes of different types of sensors in the component housing 220 may be aligned electronically via a calibration process. The bracelet may also include a radio frequency transmitting device, such as a Bluetooth transmitter, and a battery. The accelerometer may measure spatial orientation of the wrist and its motion. A transmitter may be used to send sensor measurements from the bracelet to an external processing device. A transmitter may also be used to send information about events derived from the sensor measurements to an external processing device. The electronic component housing may include a switch 230 for powering the electronics components up and down.

The wristband 210 serves to hold component(s) of the interface in place on a user's wrist. As wrist size may vary between users, it may be advantageous to make the wristband flexible enough to comfortably fit wrists of different sizes. The wristband may be made a flexible material, such as rubber, nylon, or plastic. The wristband may include an adjustable fastening device, such a Velcro strip, snaps, cable tie, or a buckle. The wristband may be formed into a complete loop that completely encircles the user's wrist when worn. Alternatively, the wristband may be a continuous loop made of a material, such as rubber or nylon that is capable of stretching in a longitudinal direction to allow the band to slide over the hand of the user and still fit the wrist tight enough to hold an accelerometer in place on the wrist.

In some implementations, a bracelet 200 may also include a wireless receiver (e.g., a Bluetooth receiver) for receiving information from a target computing device or an intermediary device. For example, the ring may receive configuration commands from target computing device that set operating parameters of the ring, such as a usage mode (e.g., to enter a cursor control mode), a power-saving mode, a sampling rate for one or more sensors, etc.

Figure 3:
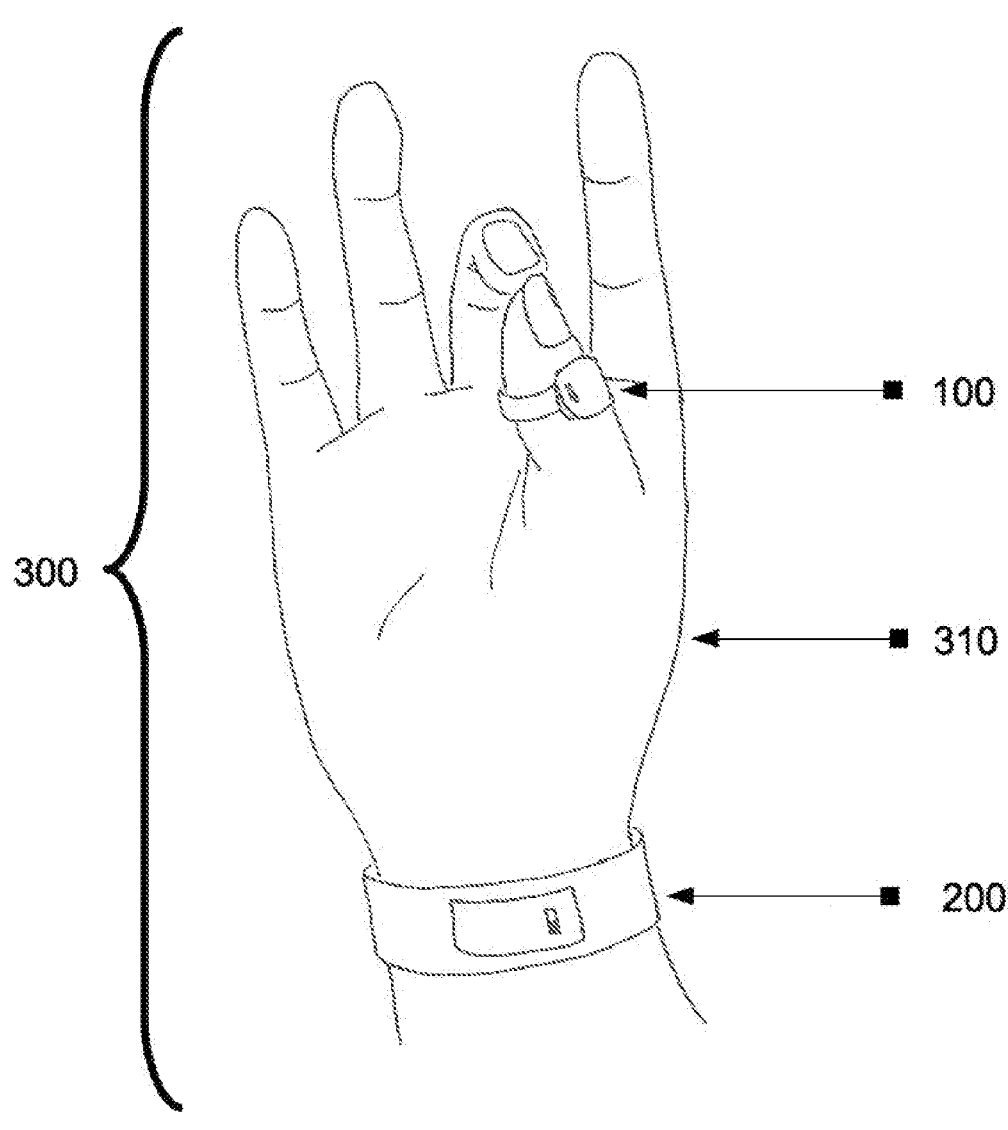
FIG. 3 is a drawing of a hand wearing an example interface ring and wrist band with the thumb pressed to the distal phalanx of the middle finger.

Referring to FIG. 3, an interface 300 may include multiple components worn on different parts of a user's hands or arms. In the example depicted in FIG. 3, the interface includes a ring 100 and a bracelet 200 worn on the same hand 310. Once the interface is in place on a user's wrist and thumb, a position tracker module may be initialized. In some implementations, the position of the sensors in both the ring and the bracelet are tracked by integrating the dynamic motion detected by both components. The change in position experienced by the bracelet serves as reference for determining how the position of the thumb has changed in relationship to the rest of the hand. In this manner the effects of unrelated user movement, such as turning, sitting, standing, walking or riding in a vehicle, on the position of the thumb may be controlled for to isolate changes in the position of the thumb relative to the rest of the hand.

In some implementations, accelerometer readings are sampled at a frequency of about 1 kHz and the resulting digital signals are processed to detect when thumb taps occur and classify taps according to the tap targets that are hit. All or part of the processing may be performed by a microprocessor located on the ring or the bracelet. All or part of the processing of accelerometer readings may be performed on a data processing device that receives readings via a radio frequency transmission from the transmitters on the ring and/or on the bracelet. The data processing device may be an internal or external processing device, such as a cellphone, that runs software configured to receive sensor readings or information (e.g., filtered signals and/or symbols) based on those readings from the interface. Alternatively the processing device may be a stand-alone device configured to receive information based on sensor readings from the interface via the radio frequency transmission. The stand-alone processing device may in turn pass information such as detected target tap events to an external processing device, such as a computer, via another interface, such as a USB (Universal Serial Bus) port.

In some implementations, the devices in the interface system may communicate with each other by means of radio frequency. For example, low-power wireless transmission from a ring with a short range (e.g., 1 foot range) may be used to convey measurement from the sensors of the ring to a processing device attached to a bracelet, which may in turn interpret those measurements and/or forward they to a target computing device via a higher power wireless communications link (e.g., a Bluetooth link). Such a configuration may allow a smaller battery to be included in the ring than in the bracelet. In some implementations, they may communicate with each other through wired connections. For example, the ring 100 and bracelet 200 may communicate sensor readings through wired connections to determine their individual spatial orientations. As another example, the bracelet may hold an energy storage that supplies power to the ring through the wire connections.

Accelerometers in the wristband may also be used to detect the spatial orientation of the hand by measuring the static acceleration caused by the gravitational pull of the Earth, which is a vector along the Earth radius, extending from the Earth center through the wearer of the interface. The orientation of the accelerometer to the user's wrist may be fixed by the wristband. Thus, the axes of the three dimensions sensed by the accelerometers may be fixed with respect to the orientation of the user's wrist. The angle of the Earth-radius vector with respect to the reference frame extended by the axes is calculated to determine the orientation of the wrist with respect to the Earth radius. Similarly, the angle of the Earth-radius vector with respect to the reference frame extended by the axes of the ring accelerometers is calculated to determine the angle of a phalanx of the thumb with respect to the Earth radius.

The Earth-radius angles of the thumb and wrist may be compared to estimate a component of the angle between the thumb and the wrist outside of the plane orthogonal to the Earth radius. The angle between the thumb and the wrist at the time that a tap is detected may be used to distinguish tap targets on the hand. Information about the current angle between the thumb and the wrist may be used in conjunction with information from a position tracking module to classify tap events by assigning them to a tap target.

In some implementations, magnetometers may be used in conjunction with accelerometers to to determine the relative orientations of the thumb ring and a reference device, such as a reference device located on the wrist. The thumb ring may include a tri-axial accelerometer and a tri-axial magnetometer. The axes of these magnetometer and the accelerometer may be aligned. The reference device may also include an accelerometer and a magnetometer whose axes are aligned. When a tap event is detected, readings from the thumb sensors and the references sensors are windowed and sampled to estimate the acceleration and magnetic field experienced by the thumb sensors and the reference sensors while the thumb is at rest relative to the rest of the hand during a tap event. These estimates are encoded as four 3-dimensional vectors: $\vec{t}_a$, $\vec{t}_m$, $\vec{r}_a$, $\vec{r}_m$. For the ensuing disclosure, we use the following notations:

$\vec{r}_m$: The magnetic flux vector detected by the magnetometer in the reference device.

$\vec{r}_a$: The acceleration vector detected by the accelerometer in the reference device.

$\vec{t}_m$: The magnetic flux vector detected by the magnetometer in the thumb device.

$\vec{t}_a$: The acceleration vector detected by the accelerometer in the thumb device.

$_x\vec{t}$: The x component of the vector $\vec{t}$ and similarly for the y and z components.

$R_m$: The rotation matrix for aligning the magnetic flux vectors.

$R_a$: The rotation matrix for aligning the acceleration vectors.

R: The rotation matrix for aligning both the magnetic flux and acceleration vectors.

A rotation that represents the relative orientation of the thumb device and the reference device during the tap event may be determined from those four vectors. That rotation may be determined in stages by first determining two component rotations, $R_m$ and $R_a$, and then combining them. First a rotation that aligns the two magnetic field vectors is calculated by taking a cross product of $\vec{r}_m$ and $\vec{t}_m$ to determine the axis of a minimum-angle rotation that aligns the two vectors as well as the magnitude of the angle of rotation. A dot product is also calculated to disambiguate the quadrant of the angle. These calculations yield an axis/angle representation of the first component rotation.

Cross product of magnetic field vectors $$\vec{x}_m = \frac{\vec{t}_m \times \vec{r}_m}{\|\vec{t}_m\|\|\vec{r}_m\|} \qquad \text{Eq 1}$$

The sine of the angle of rotation $$s_m = \sin(\theta_m) = \|\vec{x}_m\| \qquad \text{Eq 2}$$

The cosine of the angle of rotation $$c_m = \cos(\theta_m) = \frac{\vec{t}_m \cdot \vec{r}_m}{\|\vec{t}_m\|\|\vec{r}_m\|} \qquad \text{Eq 3}$$

The normalized axis of rotation $$\vec{n}_m = \frac{\vec{x}_m}{\|\vec{x}_m\|} = \frac{\vec{x}_m}{\sin(\theta_m)} \qquad \text{Eq 4}$$

The first component rotation can be computed from the rotation axis and the rotation angle. Let $\bar{c}_m = 1 - c_m$. The first component rotation is represented by a 3×3 matrix, $R_m$:

Rotation matrix for magnet field vectors

-continued $$R_m = \begin{bmatrix} _x\vec{n}_m^2 \bar{c}_m + c_m & _x\vec{n}_{m y}\vec{n}_m\bar{c}_m - _z\vec{n}_m s_m & _x\vec{n}_{m z}\vec{n}_m\bar{c}_m + _y\vec{n}_m s_m \\ _y\vec{n}_{m x}\vec{n}_m\bar{c}_m + _z\vec{n}_m s_m & _y\vec{n}_m^2\bar{c}_m + c_m & _y\vec{n}_{m z}\vec{n}_m\bar{c}_m - _x\vec{n}_m s_m \\ _z\vec{n}_{m x}\vec{n}_m\bar{c}_m - _y\vec{n}_m s_m & _z\vec{n}_{m y}\vec{n}_m\bar{c}_m + _x\vec{n}_m s_m & _z\vec{n}_m^2\bar{c}_m + c_m \end{bmatrix} \qquad \text{Eq 5}$$

The first rotation matrix is then applied to the thumb acceleration vector, $\vec{t}_a$, to determined the rotated thumb acceleration vector, $$\vec{t}_a'.$$

Rotated thumb acceleration vector $$\vec{t}_a' = R_m \vec{t}_a \qquad \text{Eq 6}$$

A second component rotation that aligns $$\vec{t}_a'$$

with the reference acceleration, $\vec{r}_a$, may be determined next. The second component rotation may be constrained to use an axis of rotation aligned with the reference magnetic field, $\vec{r}_m$, so that alignment of the two magnetic field vectors is preserved by the second component rotation. That can be done, for example, using the projections of $$\vec{r}_a \text{ and } \vec{t}_a'$$

onto the plane perpendicular to $\vec{r}_m$.

Projection of reference acceleration vector $$\vec{p}_r = \vec{r}_a - \left(\vec{r}_a \cdot \frac{\vec{r}_m}{\|\vec{r}_m\|}\right)\frac{\vec{r}_m}{\|\vec{r}_m\|} \qquad \text{Eq 7}$$

Normalized projection vector $$\vec{p}_r^n = \frac{\vec{p}_r}{\|\vec{p}_r\|} \qquad \text{Eq 8}$$

Projection of thumb acceleration vector $$\vec{p}_t = \vec{t}_a - \left(\vec{t}_a \cdot \frac{\vec{r}_m}{\|\vec{r}_m\|}\right)\frac{\vec{r}_m}{\|\vec{r}_m\|} \qquad \text{Eq 9}$$

Normalized projection vector $$\vec{p}_t^n = \frac{\vec{p}_t}{\|\vec{p}_t\|} \qquad \text{Eq 10}$$

The minimum angle rotation to align these projections will then have an axis of rotation parallel to $\vec{r}_m$, so a cross product and dot product may be applied to the projections to determine the angle of rotation in this plane that will align the projections of the acceleration vectors. This second component rotation may also be computed from an axis/angle representation and may be represented as a matrix, $R_a$.

Cross product of projected acceleration vectors $$\vec{x}_a = \vec{p}_t^{\,n} \times \vec{p}_r^{\,n}$$ Eq 11

The sine of the angle of rotation $$s_a = \sin(\theta_a) = \|\vec{x}_a\|$$ Eq 12

The cosine of the angle of rotation $$c_a = \cos(\theta_a) = \vec{p}_t^{\,n} \cdot \vec{p}_r^{\,n}$$ Eq 13

The normalized axis of rotation $$\vec{n}_a = \frac{\vec{x}_a}{\|\vec{x}_a\|} = \frac{\vec{x}_a}{\sin(\theta_a)}$$ Eq 14

Rotation matrix for magnet field vectors $$R_a = \begin{bmatrix} _x\vec{n}_a^2 \vec{c}_a + c_a & _x\vec{n}_a y\vec{n}_a \vec{c}_a - _z\vec{n}_a s_a & _x\vec{n}_a z\vec{n}_a \vec{c}_a + _y\vec{n}_a s_a \\ _y\vec{n}_a x\vec{n}_a \vec{c}_a + _z\vec{n}_a s_a & _y\vec{n}_a^2 \vec{c}_a + c_a & _y\vec{n}_a z\vec{n}_a \vec{c}_a - _x\vec{n}_a s_a \\ _z\vec{n}_a x\vec{n}_a \vec{c}_a - _y\vec{n}_a s_a & _z\vec{n}_a y\vec{n}_a \vec{c}_a + _x\vec{n}_a s_a & _z\vec{n}_a^2 \vec{c}_a + c_a \end{bmatrix}$$ Eq 15

The two component rotations may then be combined by multiplying the two matrices in the proper order to produce a matrix representation of the relative orientation of the two devices, R.

Complete rotation matrix $$R = R_a R_m$$ Eq 16

The relative orientation of the thumb and reference devices may be converted from the matrix representation to a lower dimensional representation to enable more efficient slicing to quantize the orientation estimate into a symbol estimate. For example, the matrix representation, R, may be converted to an axis /angle representation using an eigenvalue decomposition. Since the axis of the rotation is a unit vector, the axis/angle may be expressed as a three-tuple by multiplying the axis by the angle of rotation. These three-tuples may then be assigned to symbol estimates by slicing in the three dimensional space.

A slicer for the orientation estimates may be generated using standard techniques applied to corpus of tap orientation measurements taken during a known tap sequence. For example the centroids of clusters of orientation estimates corresponding to a particular tap may be used. Slicing may be accomplished by determining the nearest tap centroid to a new orientation estimate. Slicer regions may be determined based on aggregated data for many users or for a particular user by using training sequences to collect data from that user. In some cases an abbreviated training sequence may be used to customize generic slicer regions to a particular user.

The order of the decomposition of the orientation rotation into components may be reversed. For example, the component required to align the acceleration vectors may be determined first and then a constrained component rotation to approximately align the magnetic field vectors may be subsequently determined and then combined. The selection of the order in which the decomposition is performed may be informed by the signal-to-noise ratios (SNRs) experienced by the accelerometers and the magnetometers.

A calibration sequence may be performed by a user before the first use of the interface. The user may be prompted to execute each step of the calibration process using a display connected to a processing device that the interface is inputting data to. The prompt instructs the user to touch one or more of the targets on the hand and data is recorded as taps are detected. The data may be used only for the current session, or stored in memory as a user profile. In this manner, the interface may be trained to respond to the geometry of the hand and tendencies of a particular user.

In some implementations ring 100 may include a thermometer that is used to dynamically adjust an output amplifier gain for one or more of the sensors (e.g., an accelerometer) that have a response characteristics that vary with temperature.

In some implementations, not depicted, one or more accelerometers located in a second ring worn on one of the proximal phalanges of the other fingers on the hand may be used as a reference for determining position and angles of the thumb in relation to the rest of the hand.

Figure 4:
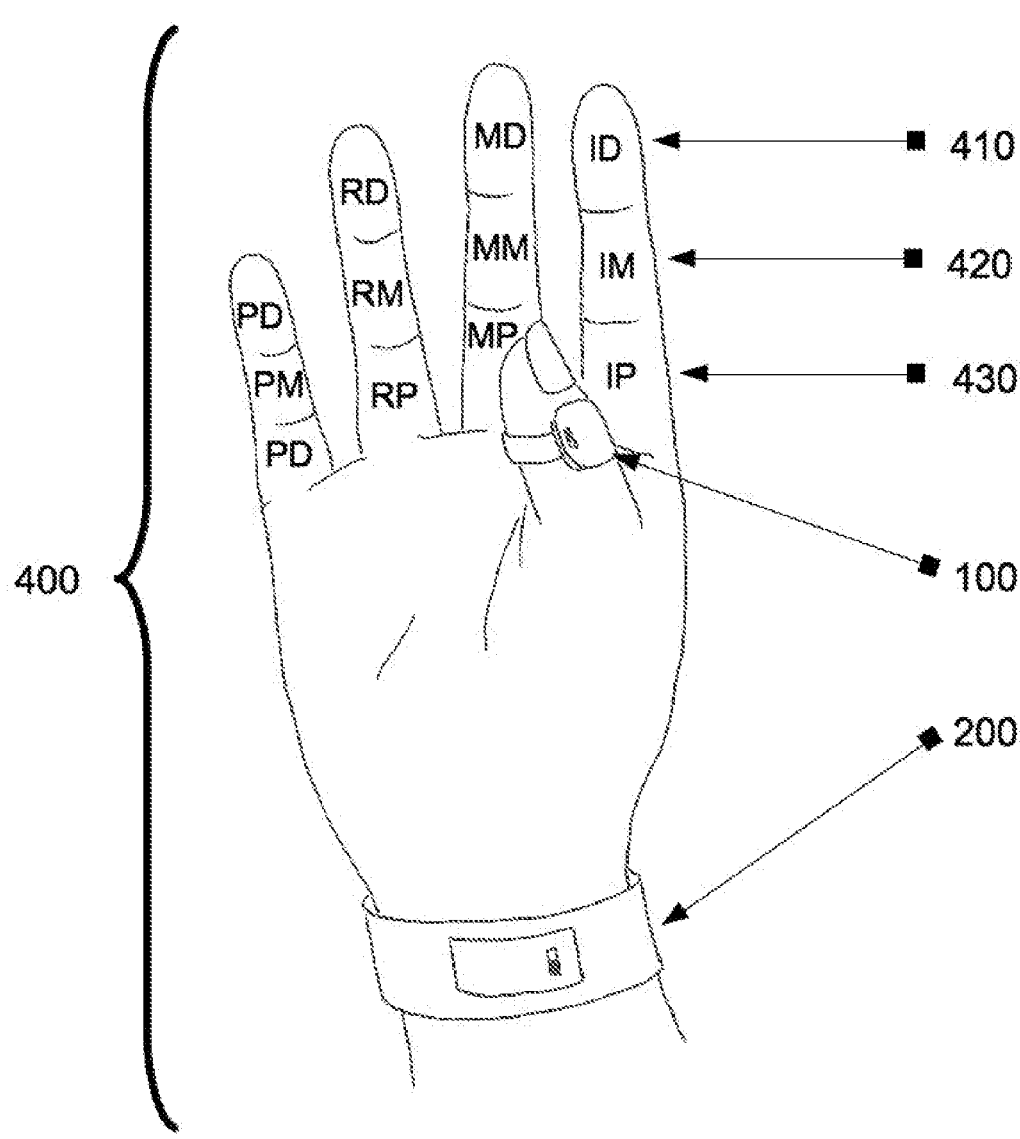
FIG. 4 is a drawing of a hand with example target locations on the fingers indicated.

Referring to FIG. 4, in some implementations, tap targets are located on phalanges of fingers of a user's hand that the user may ergonomically tap with the thumb while wearing an example interface including ring 100 and bracelet 200. An example layout 400 of tap targets on the hand is shown in FIG. 4. For each of the four other fingers on the hand, the tap targets are centered on the inside surface of the distal 410, middle 420, and proximal 430 phalanges. A mapping is established that assigns different symbols to taps of each of the targets. In the figure, each target is labeled by an associated symbol. In some implementations (not shown), the tap targets on an index finger may be centered on the side of the index finger closest to the thumb. Locating tap targets on the fingers of the user may allow a user to conduct taps without looking at the tap targets.

An interface may include a matching set of components for the other hand so that both hands may be used for data entry. In this case different symbols may be assigned to the corresponding tap targets on each hand to double the size of the symbol set. Furthermore, taps on both hands may be combined to expand the symbol set even more. For example, tapping and holding the distal phalanx of the left index finger while tapping the phalanges on the other hand may be mapped to one set of symbols; tapping and holding the medial phalanx of the left index finger while tapping the phalanges on the other hand may be mapped to another set of symbols. In this way, at least 144 (12 phalanges on the left hand times 12 phalanges on the right hand) symbols may be produced from combining the taps on the two hands.

Figure 5:
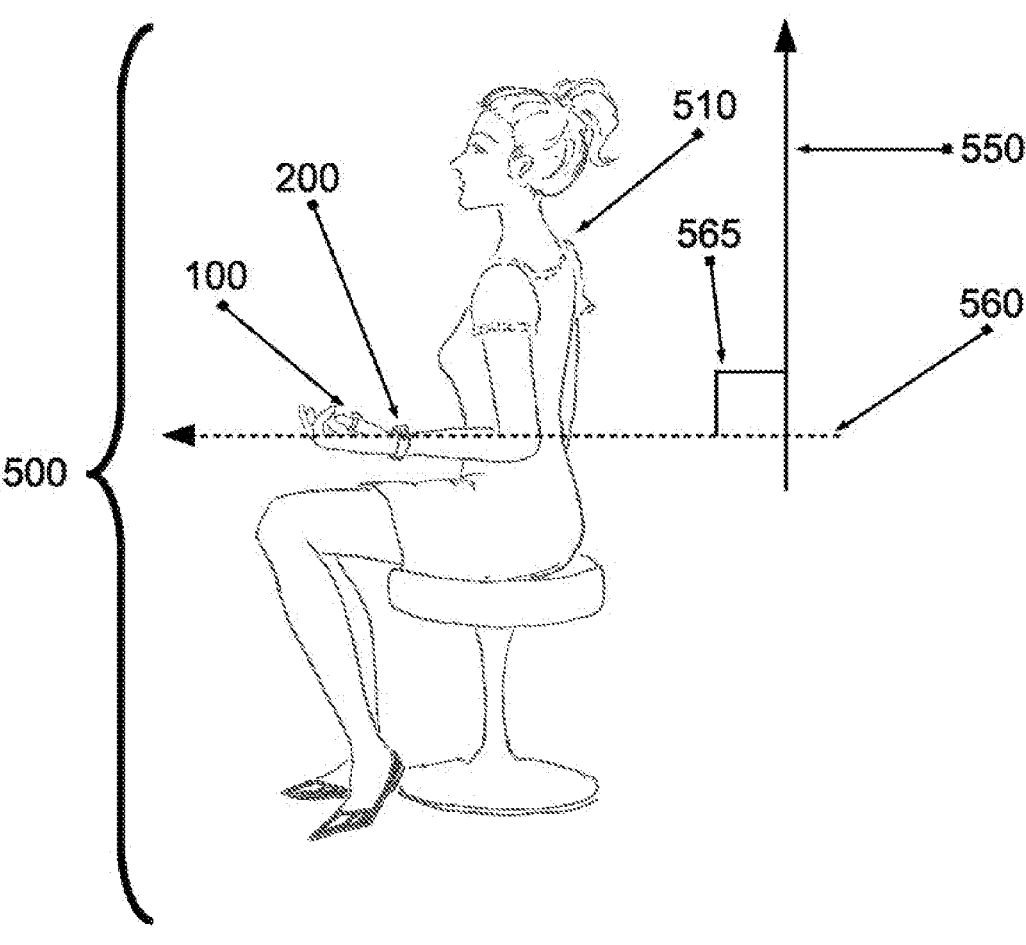
FIG. 5 is a drawing of a user wearing an an interface ring and wrist band and tapping a target with the forearm perpendicular to the Earth radius.
Figure 6:
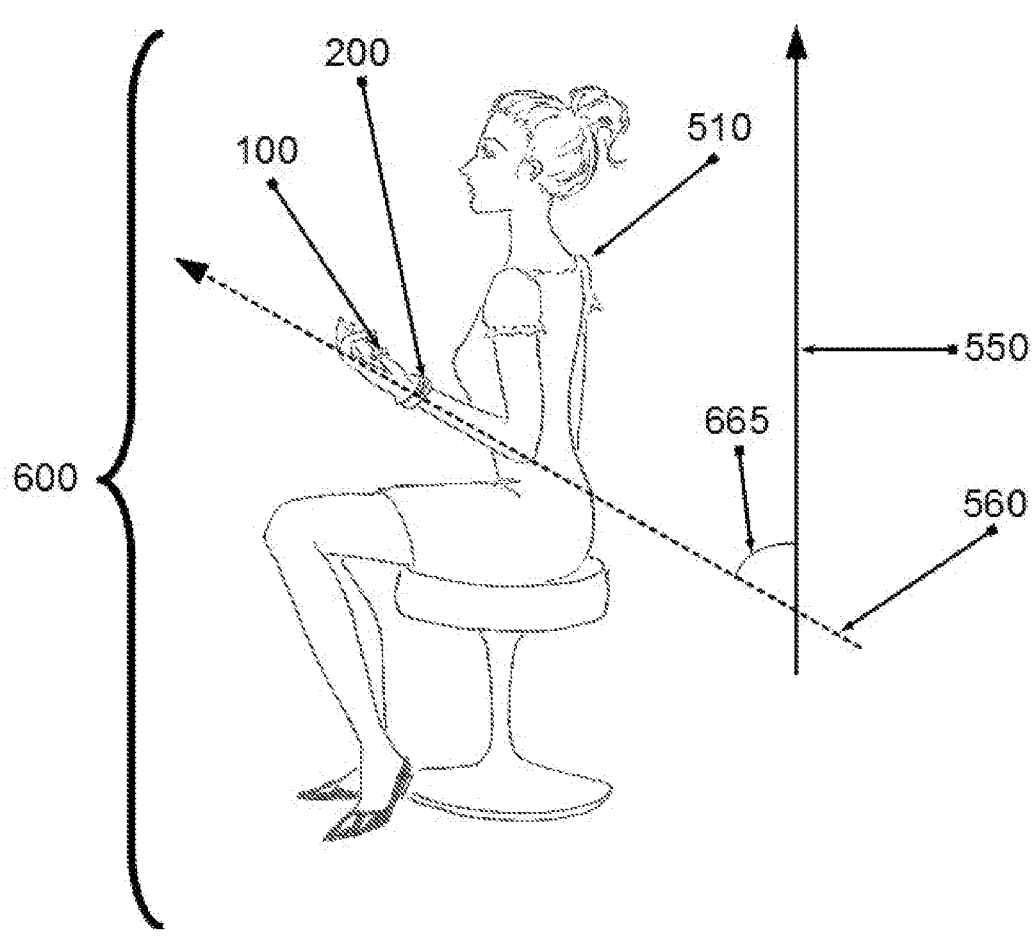
FIG. 6 is a drawing of a user wearing an an interface ring and wrist band and tapping a target with the forearm at 50-degree angle to the Earth radius.

Referring to FIG. 5 and FIG. 6, the angle of the wrist to the Earth radius may be used to distinguish multiple symbols assigned to a single tap target. In example usage scenarios 500 and 600, one of the three axes, the z-axis 560, of the accelerometers in the bracelet 200 is approximately parallel to the forearm of the user 510 and the other two axes are labeled x and y. The angle 565 of the z-axis to the Earth radius 550 may be determined and compared to thresholds to distinguish multiple sets of symbols assigned to the targets on a hand. FIG. 5 shows a user 510 wearing an interface including a ring 100 and a bracelet 200 with the forearm oriented at approximately ninety degrees to the Earth radius 550. In this position, the user 510 is able to input one set of symbols by tapping the targets on the hand with the thumb. The user 510 may access other symbols in scenario 600 by bending the elbow to, for example, raise the forearm to an angle 665 of approximately fifty degrees to the Earth Radius 550, as depicted in FIG. 6. In this position, the user 510 may input a second set of symbols by tapping the same targets on the hand. In this manner the multiple symbol sets may be assigned to different ranges of the angle between the user's forearm and the Earth radius.

Figure 7:
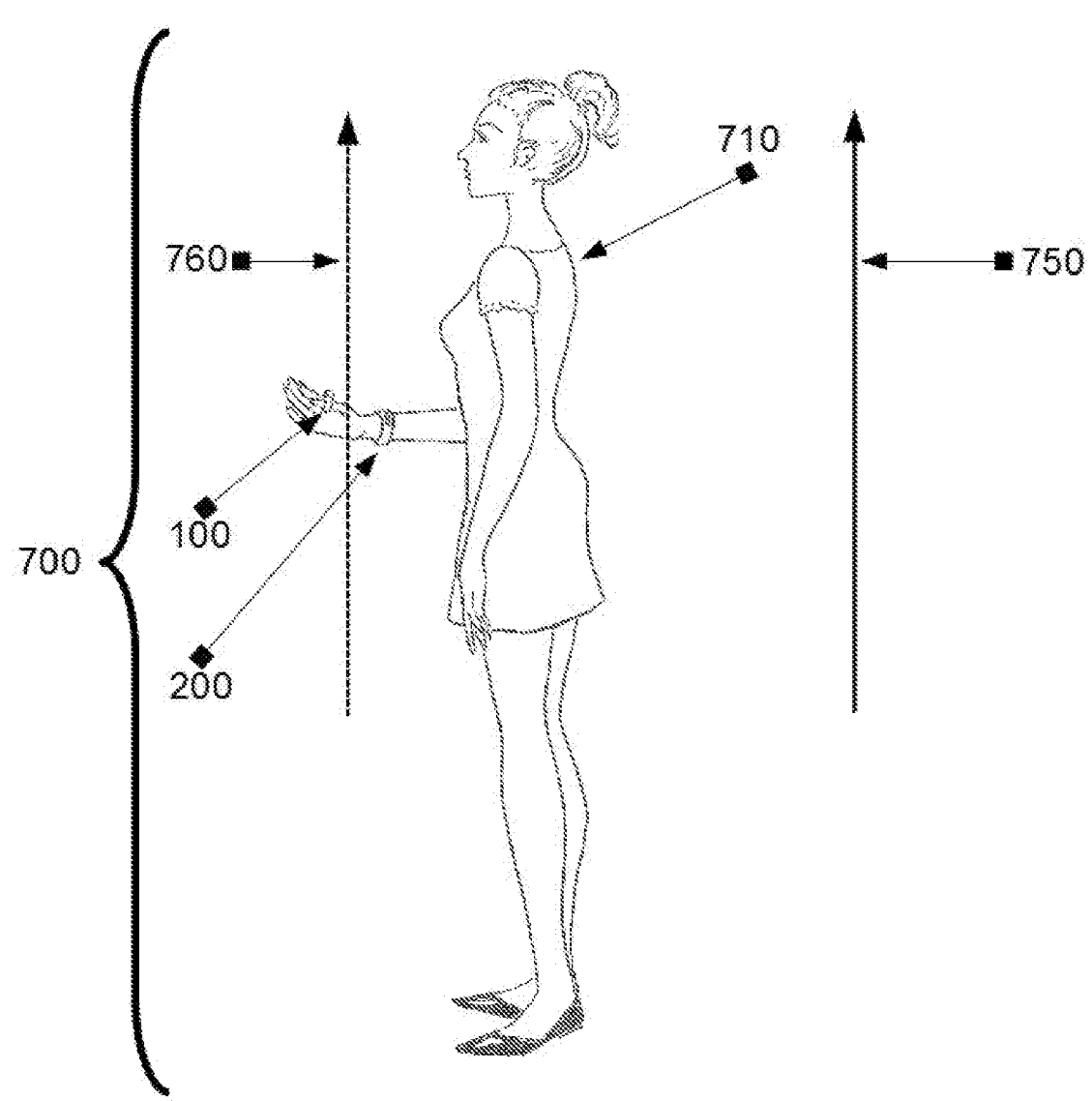
FIG. 7 is a drawing of a user wearing an an interface ring and wrist band and tapping a target with the palm facing up.
Figure 8:
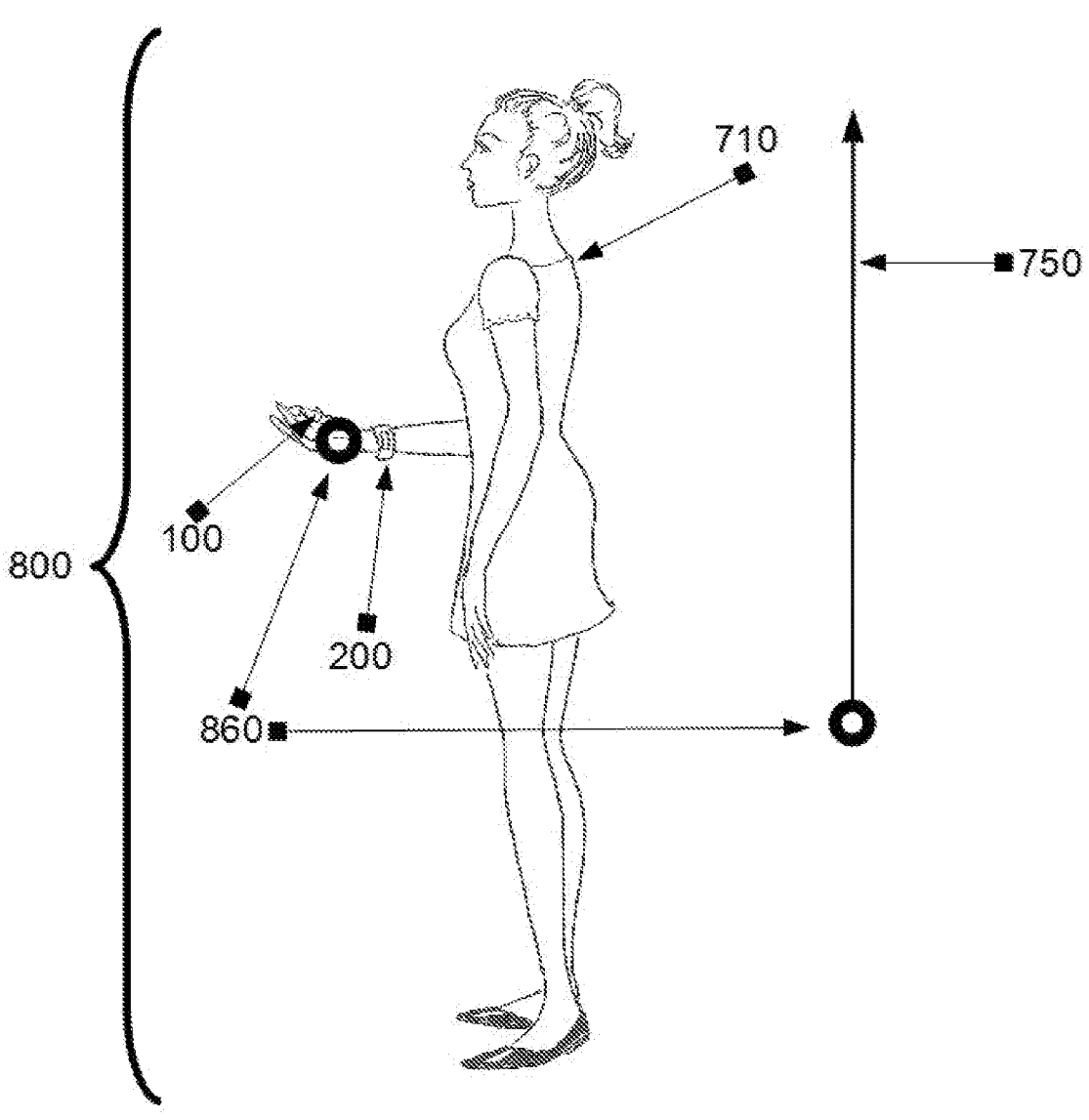
FIG. 8 is a drawing of a user wearing an an interface ring and wrist band and tapping a target with the palm facing sideways.

Referring to FIG. 7 and FIG. 8, more sets of symbols may be distinguished by detecting rotations of the wrist. For example, in usage scenario 700, one position for data entry may be with the user's wrist turned so the palm of the hand faces up, as depicted by the direction of the dashed arrow 760 in FIG. 7. An axis (e.g., an x-axis) of an accelerometer in bracelet 200 may be approximately parallel to line 760 which is perpendicular to the surface of the palm of user 710. The angle of this axis and/or the angle of a second axis that is also approximately orthogonal to a line parallel to the length of the user's forearm with an acceleration experi- enced by the accelerometer during a tap may be determined and used estimate the orientation of the user's wrist with respect to the Earth Radius 750. In this manner it can be determined that the palm of user 710 is facing up and a certain set of symbols may be assigned to tap targets on the hand. Usage scenario 800 shows another data entry position, in which the wrist is rotated so that the palm faces to the side, as depicted in FIG. 8. The dark circles 860 illustrate an axis (e.g., an x-axis) of an accelerometer in the bracelet 200 that points out of the page. In this scenario 800, the axis 860 that is approximately perpendicular to the surface of the palm is also perpendicular to the Earth Radius 750, while another axis that is also approximately perpendicular to the length of the user's forearm is approximately parallel with the Earth Radius 750. As long as the forearm is not parallel to the Earth radius, these wrist rotation positions may be distin- guished by comparing the angle between the x or y axes of the accelerometers in the bracelet and the Earth radius to thresholds. In this manner the number of wrist twist posi- tions distinguished can further multiply the number of symbols that may be signaled with the interface.

In some implementations, wrist twists may be detected by tracking fast changes in position of accelerometers of an interface. For example, the thumb-up and thumb-down gestures, may be detected for signaling approval (OK) and disapproval (CANCEL), respectively, selections in com- puter user interface and interaction (UI and UX).

Wrist orientations may also be used to enter different input modes for an interface. For example, turning the wrist so that the palm faces down could be used to enter a cursor control mode. In cursor control mode, the hand may be moved in the three dimensional space in front of the user to control a cursor in one or more dimensions. Thumb orien- tation in relation to the reference frame on the wrist may be used to determine whether the cursor is engaged or not, so that the cursor can continue to be moved in a direction beyond the reach of the user, much like a user may pick up a mouse or disengage the finger from a trackball. For example, the cursor may be disengaged when the thumb is oriented approximately perpendicular to the length of the forearm of the user (e.g., held in a thumb-up gesture) and the cursor may be engaged when the thumb is closer to parallel with the length of the forearm. For example, an angle between an axis of a sensor attached to the thumb that is approximately parallel to a portion of the thumb and an axis of a senor attached to the wrist that is approximately parallel to the forearm may be estimated to determine whether the cursor is engaged. Tap targets may be assigned different symbols in such a mode. For example, a tap target may be tapped to select or deselect item highlighted by a cursor.

In implementations of an interface that use two thumb rings, certain tap targets may be assigned meta symbols (e.g., 'shift' or 'ctrl') that change the interpretation of target taps by one thumb while the other thumb is held in place on the meta symbol target.

Figure 9:
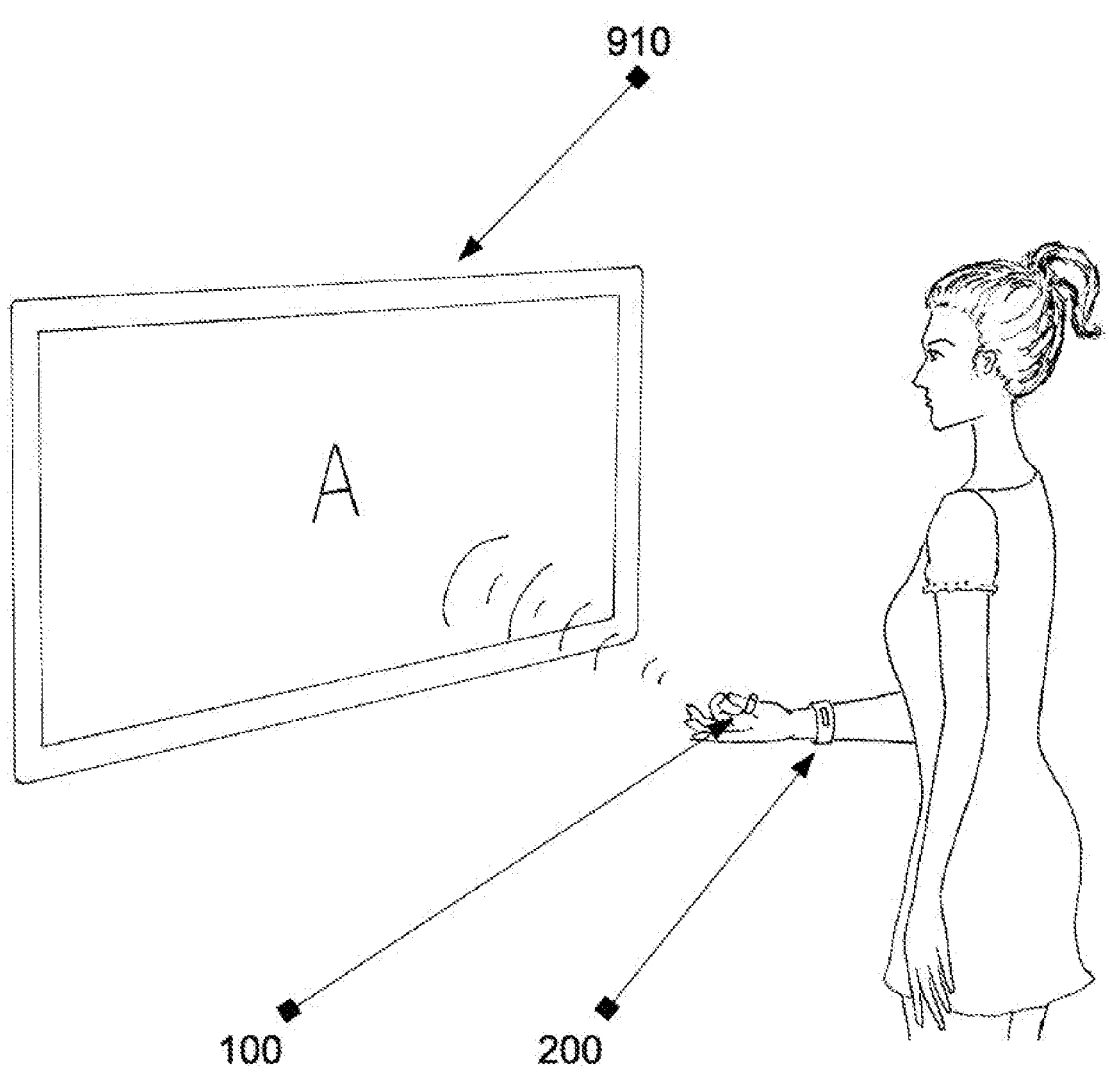
FIG. 9 is a drawing of an example interface system, which includes a combined processing-and-display unit, an interface ring, and an interface wrist band.

Referring to FIG. 9, user input received through an interface may be processed and/or used by a computing device in a variety of ways. One way, is to present graphical representations of symbols indicated by the user gestures (e.g., thumb taps) made while wearing an interface. FIG. 9 illustrates an example interface system in which a user wearing an interface including a ring 100 and a bracelet 200 performs a thumb tap to cause a combined processing and display device 910 (e.g., a Bluetooth enabled internet tele- vision) to display an alpha-numeric character associated with the thumb tap gesture. It should be noted that this is just one of many possible computing devices that may be controlled using this type of computing interface. For example, an interface (e.g., including ring 100 and bracelet 200) could be used to input data to a smartphone with an touchscreen display, a tablet device with a touchscreen display, a computing device controlling a projector, a com- puting device controlling other actuators (e.g., an environ- mental control system in an automobile), among many other computing devices.

Referring to FIGS. 10A-10C, by combining some of these methods of distinguishing symbols by detecting taps of targets on the hand and the concurrent orientation of the hand, an interface may be used to distinguish a large number of symbols. An example table that maps tap targets and hand orientations to symbols is depicted in FIGS. 10A-10C.

The mapping of tap targets to symbols may be memorized by the user. As needed, the mapping of symbols to targets may be depicted on the hand by wearing a thin glove with the symbols drawn on positions associated with their targets. The mapping may also be displayed to the user by illustrat- ing the symbols on their tap targets on the image of a hand on a display controlled by the external processing device that data is being entered into. The image of the hand(s) with marked targets may be semi-transparent, overlaying the user interface of the underlying application. Such a display could be enabled, disabled or minimized when not needed by entering a special "help" symbol.

The mapping of targets to symbols may be designed by analyzing the relative frequency of symbols used. For example statistical analysis of a collection of texts may be conducted to determine which letters and letter sequences are most commonly used. The most commonly occurring symbols may then be mapped to targets located close together and in the positions that are most easily accessible to the thumbs. Common sequences of symbols may have all their symbols assigned to targets that may be tapped in quick succession. In this manner, an interface may be optimized for particular languages or applications. The mapping of tap targets to events may be custom-configured by the users.

Figure 11:
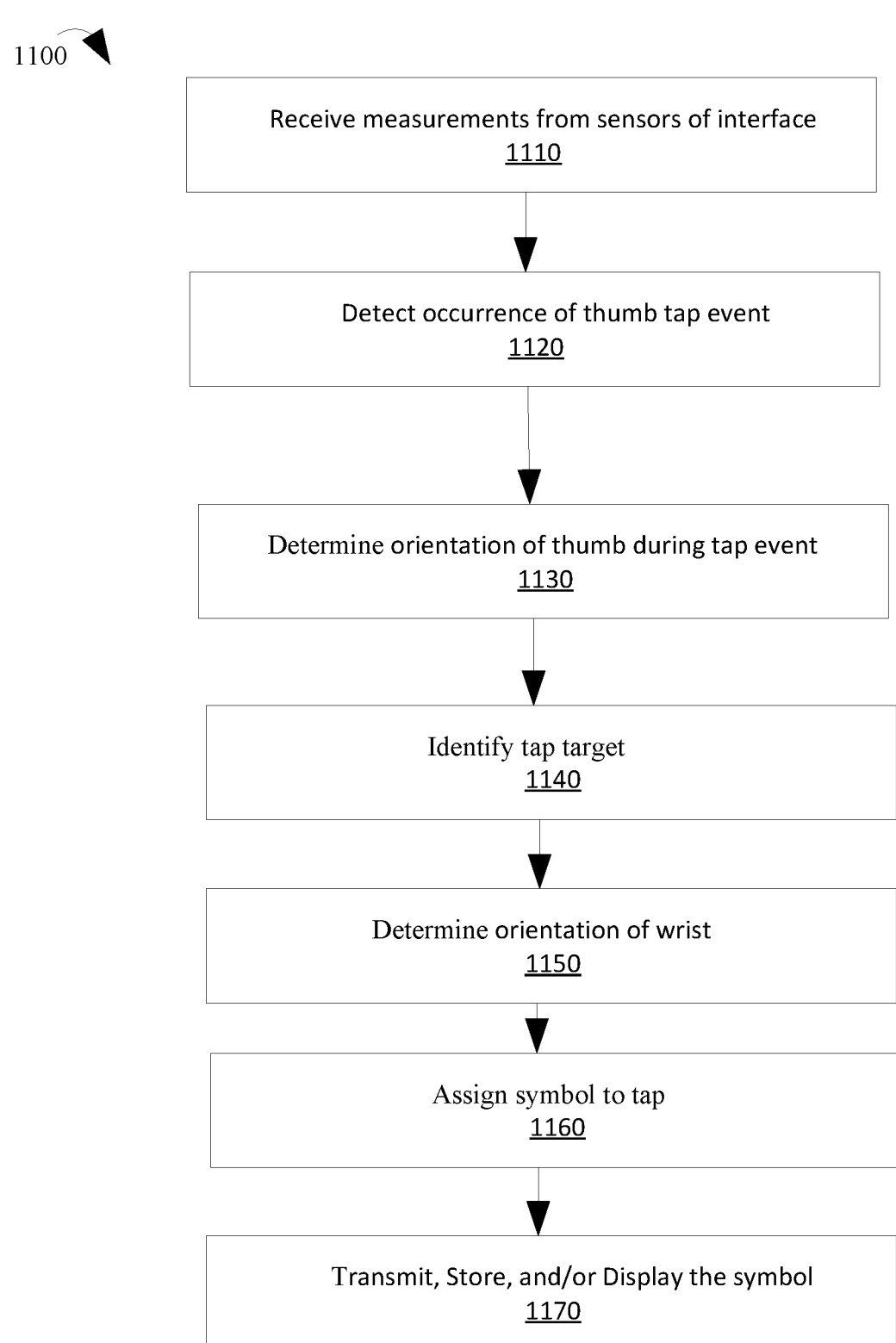
FIG. 11 is a flowchart of an example process 1100 for interpreting signals from a user computing interface

FIG. 11 is a flowchart of an example process 1100 for interpreting signals from a user computing interface. In some implementations, the process 1100 may be performed by executing driver software for the computing interface on a computing device (e.g., a smart-phone, a tablet device, laptop computer, automobile environmental control system, or a television) that a user seeks to control by making hand gestures while wearing the computing interface. A comput- ing device may include a microprocessor and a data storage device (e.g., flash memory) storing instructions for causing the computing device to perform process 1100. In some implementations, the process 1100 may be performed by a data processing device (e.g., a micro-controller or micro- processor) attached to the wrist of a user and symbols derived from the signal processing may be transmitted to a computing device that the user seeks to control. In some implementations, a data storage device (e.g., flash memory) storing instructions that cause a data processing device to perform process 1100 may also be attached to the wrist.

The process 1100 may begin by receiving 1110 measurements from sensors of the interface. The measurements may include acceleration measurements from an accelerometer that is attached to a thumb of a user. In some implementations, the measurements also include acceleration measurements from a second accelerometer that is attached to a wrist of the user. In some implementations, the measurements also include magnetic flux measurements from a magnetometer that is attached to the thumb of the user and magnetic flux measurements from a magnetometer that is attached to the wrist of the user. In some implementations, the measurements also include angular rate measurements from a gyroscope that is attached to the thumb of the user and angular rate measurements from a gyroscope that is attached to the wrist of the user.

The measurements from the sensors may be received as a time series of samples (e.g., sampled at 250 Hz, 500 Hz, 1 KHz, or 2 KHz) from each sensor output. For example, one or more sensors may be sampled using a co-located micro-controller and resulting samples may be transmitted through one or more communications links (e.g., Bluetooth wireless links and/or a serial port link) to processing device for further analysis. In some implementations, the time series of samples for each sensor is time synchronized with the time series of samples for a reference sensor (e.g., the accelerometer attached to the thumb or to the accelerometer attached to the wrist may dictate timing for the other sensor signals). For example, a phase locked loop (PLL) may be implemented to compensate for clock skew and maintain synchronization with a reference signal from a sensor that is sampled with different clock. A processing device receiving the measurements from the sensors may operate as a master in a master-slave configuration to enforce a sample timing for measurements received from multiple sensor modules of the interface. In some implementations, a training sequence that causes simultaneous excitations in two sensors may be used to establish an initial phase synchronization between the signals from the two sensors. For example, an arm on which accelerometers are worn on the thumb and the wrist may be swung at the shoulder joint to induce an approximately simultaneous change in quantities measured by sensors at both locations on the arm. In some implementations, the measurements from two different sensors of the interface may be received asynchronously. For example, sensors worn on the right and left hands may be received asynchronously.

In some implementations, the measurements may have been filtered or otherwise processed prior to receiving 1110 the measurements for the sensors. For example, a sequence samples of measurements from an accelerometer and a co-located gyroscope may be filtered and/or converted to a sequence of measurements of an orientation (e.g., encoded as Euler angles or a quaternion representation) of the co-located sensors by a co-located micro-controller before the measurements are received 1110 by an external processing device.

For example, the measurements from the sensors of the interface may be received 1110 through a wireless network interface (e.g., a Bluetooth interface) of a processing device that will interpret the measurements. In some implementations, the measurements may be received by a processing device that is co-located with some of the sensors of the interface (e.g., attached to the wrist of the user). In these implementations, the measurements from co-located sensors may be received 1110 through a bus or other short range data transfer channel while measurements from sensors located further from the processing device may be received 1110 through a wireless communication channel (e.g., a Bluetooth link) or though a two or more wires (e.g., a serial port cable) connecting sensor modules of the interface.

A tap of the thumb on a surface may be detected 1120 as an event based on the received sensor measurements. In some implementations, a tap event may be detected by filtering a sequence of acceleration measurements and/or angular rate measurements from an accelerometer and/or a gyroscope attached to the thumb of the user. Large fast changes in these measurements may be associated with a tap event. For example, the difference between consecutive samples of these measurements may be compared to a threshold (e.g., 1.2 times the acceleration due to Earth's gravity for the linear acceleration) and when the threshold is exceeded a tap event may be detected 1120. A tap detection module may also implement debouncing logic to ignore fast changes in these measurements for a short configurable period of time (e.g. 10 or 20 milliseconds) after a tap is detected. For example, tap events may be detected 1120 by a tap detection module of device driver running on a computing device. In some implementations, tap events may be detected 1120 by a tap detection module running on a processing device that is attached to the wrist of the user.

An orientation of the thumb during the tap event may be determined 1130. When a tap of the thumb is detected, signals (e.g., sequences of measurements) from sensors of the interface may be windowed and/or otherwise filtered in the neighborhood of the detected tap event to estimate characteristics of the tap event. For example, a window of sensor measurements (e.g., a 5, 10, or 20 millisecond long window) just after a large deceleration associated with the onset of a tap event may be averaged to estimate characteristics of the tap event during a brief period while the thumb is at rest (relative to the rest of the hand) and in contact with a tap target. In some implementations, the deceleration associated with the impact is itself considered as a characteristic of the tap event. For example, acceleration measurements from an accelerometer attached to the thumb may be filtered to determine an estimate of a deceleration vector caused by the impact of the thumb with the tap target. The orientation of the estimated deceleration vector relative to the axes of one or more sensors attached to the thumb may be a characteristic considered for classification of a tap event.

In some implementations, an orientation of one or more sensors attached to the thumb of the user is determined 1130 relative to the an orientation of one or more sensors attached to the wrist of the user. For example, an estimate of the acceleration experienced by an accelerometer attached to the thumb while the thumb was at rest on the tap target (e.g., acceleration due to the Earth's gravitational force, the acceleration of a vehicle the user is riding in, and/or other exogenous forces) may be compared to an estimate of the acceleration experienced by an accelerometer attached to the wrist of the user during the same period of time (e.g., a time window just after the deceleration marking the start of the tap event) to compare the relative orientations of these accelerations as experienced at each location on the hand or arm of the user. These estimates of acceleration may be determined based in part on acceleration measurements from the respective accelerometers attached to the thumb and the wrist or some other reference location.

In some implementations, the relative orientation of the thumb and the wrist is determined 1130 based in part on magnetic flux measurements from a magnetometer attached to the thumb and magnetic flux measurements from a magnetometer attached to the wrist. For example, an estimate of the magnetic flux experienced by the magnetometer attached to the thumb while the thumb was at rest on the tap target (e.g., due to the Earth's magnetic field, magnetic field from a nearby transformer or power line, and/or other sources of magnetic flux) may be compared to an estimate of the magnetic flux experienced by the magnetometer attached to the wrist of the user during the same period of time (e.g., a time window just after the deceleration marking the start of the tap event) to compare the relative orientations of these magnetic flux vectors as experienced at each location on the hand or arm of the user. Where the magnetic flux is approximately uniform in the region of space around the thumb and wrist locations, the orientations of the magnetic flux vectors, as experienced by the respective magnetometers, may provide information about the relative orientation of the two sensors.

In some implementations, an orientation of the thumb relative to the wrist may be determined 1130 by combining information about the acceleration and magnetic flux experienced at the two locations. For example, as described above in relation to Equations 1 through 16, a rotation that approximately aligns the acceleration vectors and the magnetic flux vectors estimated for the two locations may be determined that specifies an estimated orientation of the thumb relative to the wrist. The estimates of the accelerations and magnetic flux experienced at each location may be determined by filtering measurements from the respective accelerometers and magnetometers at the locations. For example, the measurements for each sensor may be similarly windowed and averaged (e.g., by applying a Hamming window lagged with respect to a large deceleration that triggered the tap event) in a period corresponding to the thumb being at rest relative to the rest of the hand on the tap target.

In some implementations, an orientation of the thumb relative to the wrist is determined 1130 based in part on angular rate measurements from a gyroscope attached to the thumb and angular rate measurements from a gyroscope attached to the wrist. The angular rate measurements from the gyroscope attached to the thumb may be integrated over a period of time ending during the detected tap event to determine an estimate of an orientation of the thumb during the tap event with respect to a reference position (e.g., a rest position of the thumb). The angular rate measurements from the gyroscope attached to the wrist may be integrated over the same period of time ending during the detected tap event to determine an estimate of an orientation of the wrist during the tap event with respect to a reference position corresponding to the reference position for the thumb. In some implementations, the reference positions for the thumb and wrist may be synchronously reset periodically (e.g., every minute) or upon prompting from a user. The estimate of orientation of the thumb may be compared to the estimate of the orientation of the wrist to determine 1130 an orientation of the thumb relative to the wrist at a time associated with the tap event. For example, a rotation may be determined that relates to the two respective estimates of orientation.

In some implementations, an orientation of the thumb relative to the wrist may be determined 1130 by combining information about the linear acceleration and angular rate experienced at the two locations. For example, acceleration and angular rate measurements for the thumb may be integrated over a period of time that ends during the tap event to determine an estimate of the position and/or orientation of the thumb during the tap event. Similarly, acceleration and angular rate measurements for the wrist may be integrated over the same period of time to determine an estimate of a position and/or orientation of the wrist during the tap event. The position and/or orientation estimates for the thumb and wrist may be compared to determine 1130 a orientation of the thumb relative to the wrist. For example, a rotation may be determined that relates to the two respective estimates of orientation and a displacement vector may be determined that relates the two estimates respective estimates of position.

For example, an orientation of the thumb may be determined 1130 by a tap classification module of device driver running on a computing device. In some implementations, an orientation of the thumb may be determined 1130 by a tap classification module running on a processing device that is attached to the wrist of the user.

A tap target that was touched during a tap event is identified 1140. A set of characteristics of the tap event may be analyzed to identify 1140 which tap target from among a set of configured tap targets has been tapped by the thumb of the user. For example, the tap targets may be configured to be located on other fingers of the user (e.g., as described in relation to FIG. 4). The characteristics of a tap event may be represented as a vector in a feature space and the tap targets may be configured by partitioning the feature space into regions associated with one or none of the tap targets.

In some implementations, the tap characteristics include an orientation of the thumb (e.g., represented as a quaternion, a Euler angles triple, or an angle weighted axis of rotation). For example, the feature space for orientations may be a three-dimensional or four-dimensional space. In some implementations, the tap characteristics include a displacement vector describing the position of the thumb relative to the wrist. In some implementations, the tap characteristics include an estimate of a deceleration vector associated with the impact of the thumb on the tap target. In some implementations, different characteristics of the tap may be combined to form a larger vector in a higher dimensional feature space. For example, feature vector may include elements of a quaternion representation of a thumb orientation and a three element representation of a displacement vector describing the position of the thumb relative to the wrist. In this case, the feature space may have seven dimensions.

The feature space may have been previously partitioned based on training data associated with each configured tap target location. For example, the partition may be determined using a nearest neighbor rule applied to a set of cluster centroids for each tap target. In some implementations, the feature space is partitioned based on training data for a large group of users. In some implementations, the feature space is partitioned based on training data for a particular user. The partition of the feature space may implemented as slicer that maps orientation data to an identification of one of the configured tap targets or an error/ignore result.

For example, a tap target may be identified 1140 by a tap classification module of device driver running on a computing device. In some implementations, a tap target may be identified 1140 by a tap classification module running on a processing device that is attached to the wrist of the user.

An orientation of the wrist is determined 1150. In some implementations, an orientation of the wrist relative to the Earth's gravitational field is used to distinguish between multiple symbols associated with a tap target. An estimate of an orientation of an acceleration experienced by the accelerometer attached to the wrist with respect to the axes of that accelerometer during the tap event may be determined based on acceleration measurements from that accelerometer. The acceleration experienced at the wrist during a tap event may be dominated by acceleration caused by the gravitational force of the Earth. For example, measurements from the accelerometer attached to the wrist may be windowed and averaged in a time period corresponding to the tap event to determine an estimate of the acceleration due to gravity as a vector represented in the basis of the axes of the accelerometer. Estimates of angles between this gravity vector and the axes of the accelerometer may be determined as needed to classify the orientation of the wrist with respect to the gravity vector. For example, one axis of the accelerometer may be assumed to be approximately parallel to the forearm of the user when the user wears the interface, while the other two axes are perpendicular to the first axis.

For example, a wrist orientation may be determined 1150 by a tap classification module of device driver running on a computing device. In some implementations, a wrist orientation may be determined 1150 by a tap classification module running on a processing device that is attached to the wrist of the user.

A symbol is assigned 1160 to the tap event. A configured mapping (e.g., the mapping illustrated in FIGS. 10A-10C) of tap targets to one or more symbols may be retrieved and used to assign 1160 a symbol to the detected tap event. In some implementations, multiple symbols are associated with a tap target and a symbol is selected from among the multiple symbols associated with the tap target based on the orientation of an acceleration experienced by the accelerometer attached to the wrist of the user. This acceleration may be dominated by an acceleration due to gravity and may provide an estimate of the orientation of the wrist with respect to gravitational field of the Earth. In some implementations, an estimate of the angle between this acceleration and an axis parallel to the forearm of the user may be used to select a symbol (e.g., as described above in relation to FIGS. 5, 6 and 10A-10C). In some implementations, estimates of one or more angles between this acceleration and one or more axes that are perpendicular to length of the forearm may be used to select a symbol (e.g., as described above in relation to FIGS. 7, 8 and 10A-10C). Thus, a user may be enabled to indicate a choice from among the plurality of the symbols associated with the tap target, by adjusting the angle of wrist and/or the angle of a forearm of the user with respect to the gravitational force of the Earth during the tap.

Examples of symbols that may be assigned to a tap include an alpha-numeric character, a Chinese character, a command for a computing device that will cause the computing device to execute an action (e.g., send a text message or e-mail, answer a call, initiate a call dialing sequence, change slides in a presentation, turn on a radio or an air conditioner, etc.), and meta-keys (e.g., 'shift') that change the interpretation of a concurrent or subsequent tap, among others.

For example, a symbol may be assigned 1160 by a tap classification module of device driver running on a computing device. In some implementations, a symbol may be determined 1150 by a tap classification module running on a processing device that is attached to the wrist of the user.

The symbol may be transmitted, stored, and/or displayed 1170. In some implementations, the symbol may be transmitted 1170 to another device. For example, a processing device attached to the wrist of the user that performs process 1100 may transmit (e.g., via a wireless communications link) the symbol assigned to a detected tap to a computing device. In some implementations, the symbol may be stored 1170. For example, computing device may buffer a sequence of symbols for later access by an application or some other thread running on the computing device. In some cases, the symbols may be stored in non-volatile memory (e.g., written to a file on a hard-drive when a text file is edited using the interface. In some implementations, the symbol may be displayed 1170 through a display device controlled by the device performing process 1100. For example, a symbol (e.g., an alpha-numeric character) assigned to the tap may be displayed by a projector, or an LCD display on a mobile device (e.g., a smart-phone or tablet), among other types of displays.

In some implementations, process 1100 may be repeated in a loop to process sequences of tap events while the interface is in an active mode.

In some implementations, a user is enabled to turn a palm side of the wrist down to face towards the Earth to enter a cursor manipulation mode, in which acceleration measurements from an accelerometer of the interface (e.g., an accelerometer attached to the wrist of a user) is used to move a cursor in a virtual space. In this cursor manipulation mode, some thumb tap events may be used to interact with object in the virtual space. For example, certain tap targets may be mapped to mouse clicks while the user has their palm facing down toward the Earth.

Other manners initiating or terminating a cursor manipulation mode are possible. For example, a user may execute special gestures (e.g., a particular thumb tap or another type of gesture). In some implementations, an interface is used to track three-dimensional spatial location of a user's hand and sensor data may be used to determine two-dimensional or three-dimensional cursor location. In some implementations, thumb orientation and/or position in relation to the reference frame on the wrist may be used to determine whether the cursor is engaged or not, so that the cursor can continue to be moved in a direction beyond the reach of the user. For example, the cursor may be disengaged when the thumb is oriented approximately perpendicular to the length of the forearm of the user (e.g., held in a thumb-up gesture) and the cursor may be engaged when the thumb is closer to parallel with the length of the forearm. Taps and other spatial gestures can then be used to interact with objects in a virtual space (e.g., replacing mouse clicks or joystick commands). In some implementations, angular rate measurements from a gyroscope in an interface may be interpreted to enable a user to rotate objects in virtual space that have been selected with a cursor while operating in a cursor manipulation mode. For example, a box in three-dimensional virtual space may be selected with the interface by using a gesture (e.g., a sustained thumb tap) to 'grab' the object. The box may then be turned or rotated to a desired orientation based on angular rate measurements from a gyroscope attached to a hand (e.g., to a thumb or wrist) of the user as the user rotates their hand. Another gesture (e.g., removing the thumb from a sustained tap target location) may be used to 'release' the object, leaving it in the new orientation within the virtual space. In some implementations, a user may be enable to reorient objects in a virtual space based on measurements from an accelerometer and a magnetometer in an interface. For example, the orientation of the hand may be determined at different times as a user turns the hand to manipulate an object by analyzing accelerometer and magnetometer measurements to estimate the orientation of the hand in relation to the background gravitational and magnetic fields (e.g., the Earth's gravity and the Earth's magnetic field). Differences in the estimated orientations with respect to the background fields at two more times may be used to update the orientation of an object in the virtual space in a corresponding manner.

In some implementations, a computing interface described above is paired with a display to facilitate user data entry in various ergonomic positions. For example, the interface (e.g., including one or more sensors worn on the thumb and one or more sensors worn on the wrist) may be connected to a processing device, such as a computer, which is in turn connected to a display device, such as a projector. A user's body is oriented in a comfortable position and the display is positioned in the user's natural line of sight. For example, a user may lie in a bed or in a reclining chair and view a display projected onto the ceiling. From this position, the user may enter data via the interface and receive visual feedback via the display. Data entry mode may be started and stopped by distinctive motions of the hand that are detected with one or more accelerometers in the interface. For example movement of the hand quickly in a circle may be used to indicate the start or stop of a data entry session. The orientation of a plane in which this circular motion occurs may be used to set a reference earth radius angle for the session. Earth radius angles estimated during the session may be rotated by an amount determined by the orientation of the plane of the circular motion. For example, if the plane of the circular motion is parallel to the detected gravitational acceleration, then the measured wrist orientations may be left unadjusted, while, if the plane of the circular motion is orthogonal to the detected gravitational acceleration (e.g., because the user is lying on their back while making the circular motion in front of them), the measured wrist orientations may be rotated by 90 degrees to recover orientations in with respect to the user's body. In this manner a user's training with one set of wrist orientations may be used while the body is in different positions.

The computing interface may be used to control a wide variety of computing devices in different contexts. For example, a computing interface including a ring may be used to control one or more processing devices integrated in an automobile. Gestures (e.g., thumb taps) may be used to control various environmental systems in the automobile. For example, a tap target may be mapped to a command for turning an air conditioner on. Another tap target may be mapped to a command for turning a radio on. Another tap target may be mapped to a command for seeking or selecting a radio station. Another tap target may be mapped to a command for unlocking a door, and so on.

In some implementations, measurement data from sensors in an interface or other information (e.g., symbols) based on the sensor measurements may be transmitted to multiple target processing devices. For example, an interface may be used to broadcast symbols derived from sensor measurements reflecting user hand motions for display on multiple displays.

In some implementations, a interface described herein is paired with a visual gesture recognition system. The position tracking capability of the interface may be used in conjunction with data from the visual sensors (e.g., camera(s)) to enhance detection of gestures. For example, when the line of sight between the visual sensor and the thumb or the entire hand is obscured, data from the interface may be used to interpolate gestures.

In some implementations, an interface includes sensor modules or housings that are detachable from a corresponding fastening article (e.g., a thumb ring or a wrist band). Thus, fastening articles may be interchangeable. A user may own multiple fastening articles and switch between them for various reasons, such as aesthetics or comfort. For example, alternative fastening articles may be different colors or some fastening articles may include jewels or other aspects of traditional jewelery.

Any processes described herein, are not limited to the hardware and software described above. All or part of the processes can be implemented as special purpose logic circuitry, such as an FPGA (Field Programmable Gate Array) and/or an ASIC (Application Specific Integrated Circuit). All or part of the processes can be implemented, at least in part, via a computer program product tangibly embodied in non-transient computer-readable media, for execution by or to control the operation of one or more data processing apparatus, such as a computer, special purpose microprocessor, or programmable logic components. A computer program can be written in any programming language, including compiled or interpreted languages. A computer program can be implemented as a stand-alone program or as portion, such as a module or subroutine, of a larger program. A computer program can be deployed to be executed on a single data processing device or on multiple data processing devices.

Components of different implementations described above may be combined to form other implementations not specifically described above. Other implementations not specifically described above are also within the scope of the following claims.

What is claimed is:

1. A system comprising:
   a first accelerometer;
   a first fastening article attached to the first accelerometer, the first fastening article capable of holding the first accelerometer in place on a portion of a thumb of a user;
   a second accelerometer;
   a second fastening article attached to the second accelerometer, the second fastening article capable of holding the second accelerometer in place on a portion of a wrist of a user;
   a first magnetometer attached to the first fastening article; and
   a second magnetometer attached to the second fastening article.

2. The system of claim 1, in which the first fastening article is a ring band.

3. The system of claim 1, in which the second fastening article is a wrist band.

4. The system of claim 1, comprising:
   a first gyroscope attached to the first fastening article; and
   a second gyroscope attached to the second fastening article.

5. The system of claim 1, comprising two or more wires that connect the first fastening device to the second fastening device.

6. The system of claim 1, comprising a wireless transmitter attached to the second fastening article, wherein the wireless transmitter is configured to transmit data based on acceleration measurements from the second accelerometer to a computing device.

7. The system of claim 1, comprising a wireless transmitter attached to the second fastening article, wherein the wireless transmitter is configured to transmit data based on acceleration measurements from the first accelerometer to a computing device.

8. The system of claim 1, comprising a processing device configured to:

receive acceleration measurements from the first accelerometer; and determine, based at least in part on the received acceleration measurements, when a thumb of a user wearing the first fastening article and the second fastening article has been tapped against a surface.

9. The system of claim 8, in which the processing device is further configured to:

receive acceleration measurements from the second accelerometer;

when a tap of the thumb is detected, determine, based at least in part on acceleration measurements from the first accelerometer and the second accelerometer, which tap target from among a set of tap targets located on fingers of a hand of the user have been tapped by the thumb; and map the tap of the tap target to a symbol associated with the tap target.

10. The system of claim 8, in which the processing device is attached to the second fastening article.

11. The system of claim 8, in which the processing device is part of a remote computing device.

12. The system of claim 1, comprising a processing device configured to:

receive acceleration measurements from the first accelerometer;

determine, based at least in part on the received acceleration measurements, when a thumb of a user wearing the first fastening article has been tapped against a surface;

receive acceleration measurements from the second accelerometer;

receive magnetic flux measurements from the first magnetometer and from the second magnetometer;

when a tap of the thumb is detected, determine, based at least in part on acceleration measurements from the first accelerometer and the second accelerometer and on magnetic flux measurements from the first magnetometer and the second magnetometer, which tap target from among a set of tap targets located on fingers of a hand of the user have been tapped by the thumb; and map the tap of the tap target to a symbol associated with the tap target.

13. A method comprising:

receiving a first set of acceleration measurements from a first accelerometer that is attached to a thumb of a user;

receiving a second set of acceleration measurements from a second accelerometer that is attached to a wrist of the user;

receiving a first set of magnetic flux measurements from a first magnetometer that is attached to the thumb of the user;

receiving a second set of magnetic flux measurements from a second magnetometer that is attached to the wrist of the user;

detecting, based at least in part on the first set of acceleration measurements, when the thumb is tapped on a surface;

when a tap of the thumb is detected, determining, based at least in part on the first set of acceleration measurements and the second set of acceleration measurements, an orientation of the first accelerometer relative to the second accelerometer, wherein the orientation is determined based at least in part on the first set of magnetic flux measurements and the second set of magnetic flux measurements;

identifying, based on the orientation, a tap target, from among a plurality of tap targets located on fingers of the user, that was touched during the tap;

assigning a symbol associated with the tap target to the tap; and transmitting, storing, or displaying the symbol.

14. The method of claim 13, in which determining the orientation comprises:

filtering the first set acceleration measurements to determine a first estimate of acceleration experienced by the first accelerometer while the thumb was at rest with respect to a hand of the user on the tap target; and filtering the second set of acceleration measurements to determine a second estimate of acceleration experienced by the second accelerometer while the thumb was at rest with respect to the hand of the user on the tap target.

15. The method of claim 13, in which determining the orientation comprises:

filtering the first set magnetic flux measurements to determine a first estimate of magnetic flux experienced by the first magnetometer while the thumb was at rest with respect to the hand of the user on the tap target; and filtering the second set of magnetic flux measurements to determine a second estimate of magnetic flux experienced by the second accelerometer while the thumb was at rest with respect to the hand of the user on the tap target.

16. The method of claim 13, comprising:

determining, based on the second set of acceleration measurements, an estimate of an orientation of an acceleration experienced by the second accelerometer with respect to the axes of the second accelerometer during the tap; and wherein assigning the symbol to the tap comprises selecting the symbol from among a plurality of symbols associated with the tap target based on the orientation of the acceleration experienced by the second accelerometer.

17. A system comprising:

a data processing apparatus;

a data storage device storing instructions executable by the data processing apparatus that upon execution by the data processing apparatus cause the data processing apparatus to perform operations comprising:

receiving a first set of acceleration measurements from a first accelerometer that is attached to a thumb of a user;

receiving a second set of acceleration measurements from a second accelerometer that is attached to a wrist of the user;

receiving a first set of magnetic flux measurements from a first magnetometer that is attached to the thumb of the user;

receiving a second set of magnetic flux measurements from a second magnetometer that is attached to the wrist of the user;

detecting, based at least in part on the first set of acceleration measurements, when the thumb is tapped on a surface;

when a tap of the thumb is detected, determining, based at least in part on the first set of acceleration measurements and the second set of acceleration measurements, an orientation of the first accelerometer relative to the second accelerometer, wherein the orientation is determined based at least in part on first set of magnetic flux measurements and the second set of magnetic flux measurements;

identifying, based on the orientation, a tap target, from among a plurality of tap targets located on fingers of the user, that was touched during the tap;

assigning a symbol associated with the tap target to the tap; and transmitting, storing, or displaying the symbol.

18. The system of claim 17 in which determining the orientation comprises:

filtering the first set acceleration measurements to determine a first estimate of acceleration experienced by the first accelerometer while the thumb was at rest with respect to a hand of the user on the tap target; and filtering the second set of acceleration measurements to determine a second estimate of acceleration experienced by the second accelerometer while the thumb was at rest with respect to the hand of the user on the tap target.

19. The system of claim 17 in which determining the orientation comprises:

filtering the first set magnetic flux measurements to determine a first estimate of magnetic flux experienced by the first magnetometer while the thumb was at rest with respect to the hand of the user on the tap target; and filtering the second set of magnetic flux measurements to determine a second estimate of magnetic flux experienced by the second accelerometer while the thumb was at rest with respect to the hand of the user on the tap target.

20. The system of claim 17, in which the operations comprise:

receiving a first set of angular rate measurements from a first gyroscope that is attached to the thumb of the user; and receiving a second set of angular rate measurements from a second gyroscope that is attached to the wrist of the user; and wherein the orientation is determined based at least in part on first set of angular rate measurements and the second set of angular rate measurements.

\* \* \* \* \*